United States Patent [19]
Olmstead et al.

[11] Patent Number: 5,247,381
[45] Date of Patent: Sep. 21, 1993

[54] APPARATUS AND METHOD FOR AUTOMATICALLY RECONFIGURING, FREE SPACE LOCAL AREA NETWORK SYSTEMS

[75] Inventors: Charles Olmstead, Worcester; Wayne E. Moore, Marlboro; Robert M. Gordon, Oxford; Ralph R. Guiffre, Pepperell; Christopher L. Hallinan, Shrewsbury; George Duane, Weymouth, all of Mass.

[73] Assignee: Infralan Technologies, Inc., Acton, Mass.

[21] Appl. No.: 887,584

[22] Filed: May 20, 1992

Related U.S. Application Data

[63] Continuation of Ser. No. 641,869, Jan. 16, 1991, abandoned.

[51] Int. Cl.$^5$ .................... H04B 10/20; H04J 14/00
[52] U.S. Cl. .................... 359/118; 359/120; 359/136; 359/172
[58] Field of Search ............. 359/118, 113, 152, 159, 359/120-121, 136, 147, 171-172; 385/24

[56] References Cited

U.S. PATENT DOCUMENTS

| | | | |
|---|---|---|---|
| 4,701,904 | 10/1987 | Darcie | 359/152 |
| 4,809,257 | 2/1989 | Gantenbein et al. | 359/118 |
| 4,850,045 | 7/1989 | Funke | 359/118 |
| 4,975,926 | 12/1990 | Knapp | 359/159 |
| 5,099,346 | 3/1992 | Lee et al. | 359/118 |

*Primary Examiner*—Edward L. Coles, Sr.
*Assistant Examiner*—Kinfe-Michael Negash
*Attorney, Agent, or Firm*—McCormick, Paulding & Huber

[57] ABSTRACT

Optical and electronic mechanisms for establishing bi-directional line-of-sight optical links between neighboring nodes to maintain continuous, error-free operation of a network are disclosed. The system provides operational status indication signals for operators and for data communication devices that are attached to nodes. The system provides decision-making logic systems to reconfigure the network path instantly and automatically to a hot standby path if an optical link between neighboring nodes becomes impaired. The system operates without a central controller and at the physical level of the Open System Interconnection reference model without modification to the Medium Access Control or Logical Link Control. Operation is transparent to all common network standards.

19 Claims, 27 Drawing Sheets

APPARATUS AND METHOD FOR AUTOMATICALLY RECONFIGURING, FREE SPACE LOCAL AREA NETWORK SYSTEMS

This is a continuation of co-pending application Ser. No. 641,869 filed on Jan. 16, 1991, now abandoned.

BACKGROUND OF THE INVENTION

The present invention relates generally to a Free Space Optical Local Area Network (LAN) and deals more particularly with apparatus and a related method for maintaining the concurrent viability of a bi-directional free space optical path. The invention also deals with apparatus and a related method for automatically reconfiguring the LAN to provide interconnection of a conventional physical LAN and Free Space Optical LAN.

The two most commercially successful methods for arbitrating access to local area network (LANS) are Carrier Sense Multiple Access/Collision Detect (IEEE 802.3) and Token Ring (IEEE 802.5). The LAN topologies used with these protocols are stars (a central hub), rings, strings, or combinations thereof. Typical media used for communication include coaxial cable, shielded or unshielded twisted pair wire, and fiber optic cable. The present invention uses generally directed optical signals transmitted line of sight through free space. A Free Space Local Area Network System is disclosed in pending applications assigned to the same assignee as the present identification U.S. Ser. No. 07/450,404 filed Dec. 14, 1989 and PCT application, entitled "Free Space Local Area Network System" filed Dec. 14, 1990, both of which are incorporated herein by reference and to which applications reference may be made for further details. Radio, another possible method communication via free space, has not been used commercially to date with these protocols.

The most significant advantages of free space over physical media are more flexibility in adding or moving data communication equipment and, in many installations, less cost. Physical media LAN systems have certain limitations that do not arise with free space optical systems and free space optical systems have several operational characteristics that do not arise with physical media systems. This invention discloses means for minimizing the operational problems that are unique to free space optical systems.

The unique aspects of free space optical systems fall into two general categories. The first stems from line of sight communications and the possibility that a link might become obstructed for short intervals and then return to viability when the obstruction is removed. In contrast, when a physical media link becomes impaired, it is usually because it has become disconnected, severed, or broken and the link cannot be returned to viability until specific remedial actions have been taken. The second unique aspect is that establishing a viable free space optical link from point A to point B does not necessarily result in a viable link from point B to point A. A robust link requires that the link from A to B and the link from B to A be viable concurrently.

Applicants are not aware of relevant prior art on free space local area networks, either radio or optical, dealing with the issues of establishing bi-directional viability of communication links for maintaining alternate links on hot standby if an operating link fails. Prior art related to physical media such as cables, wires, or optical fibers teach means for alternate links on hot standby that require either modifications to Medium Access Control (MAC) or Logical Link Control (LLC) levels of the Open System Interconnection (OSI) Reference Model, a central control station, or complex control communication methodologies involving more than two nodes on the network.

The present invention reconfigures free space optical links to provide an alternative communication path automatically and instantly for network information if an operational free space optical link becomes impaired thereby maintaining ongoing flow of network information without interruption. The free space optical links are restored to the original configuration when the impairment is resolved. Link information to control both reconfiguration and restoration is restricted to the two physical ends of an optical link.

The present invention operates at the physical level of the OSI Reference Model, that is, functionality can be independent of the network protocol being used by the networked communication devices and vice versa.

One object of the present invention is to provide means for network communication via free space optical links that conform with IEEE 802.3 or 802.4 or 802.5 or RS-232 or FDDI or other specifications that are proprietary.

Another object of the invention is to provide indications of received optical power to facilitate alignment of a free space optical link.

A further object is to provide indications of a viable free space optical link and to provide indications when the link is not viable.

A further object is to short circuit the data path from the optical transmitter to the optical receiver, or vice versa, of an optical link when the link becomes impaired and to remove the short circuit when impairment is resolved.

A further object of the invention is for nodes to provide indications of operational status to attached communication devices.

A further object of the invention is to provide means for the nodes to alter their operational status on command from attached communication devices.

A further object of the invention is for neighboring nodes with two or more pairs of optical links to provide hot standby communication capability automatically and instantly if the free space optical link between them becomes non-operational.

A further object of the invention is for neighboring nodes with two or more pairs of optical links that have suffered an impairment to the free space optical link between them and have reconfigured, to be restored to the original configuration when the free space optical link becomes unimpaired.

A further object of the invention is to provide means for the nodes to enable insertion of attached communication devices into the network's data path when a free space optical link is viable and to isolate attached communication devices from an optical link when it is not viable.

A further object of the invention is to limit the propagation of link maintenance control signals to the nodes at the two physical ends of free space optical link.

SUMMARY OF THE INVENTION

In accordance with the present invention, there are two possible configurations for optical nodes on a free space LAN. In the first, two or more nodes communicate directly with two or more nodes at a central hub so that communication between nodes is via the central hub also known as a so-called "star". The "star" configuration requires that each node have at least one optical receiver and one optical transmitter. This configuration is also compatible with both the IEEE 802.3 and 802.5 protocols.

In the second configuration, a node, which may have communication devices attached to it, communicates directly with another node, which may also have communication devices attached to it. It can be seen that a network with more than two such nodes will require each node to have at least two pairs of optical receivers and transmitters: one pair for a "normal" communication channel and the second pair for a "hot standby" backup for the first pair. It is also seen that the direction of flow of communication on one channel is opposite to the direction of flow on the other channel.

Nodes communicate with their neighbors via free space optical links as described in the above referenced patent applications and the links can be arrayed in a string or a ring or a star. A string is inherently compatible with the IEEE 802.3 protocol and, with a second path for return flow, can be made compatible with the IEEE 802.5 protocol. A ring is inherently compatible with the IEEE 802.5 protocol and, with collision detection, can be made compatible with the IEEE 802.3 protocol. A star is inherently compatible with both the IEEE 802.3 and 802.5 protocols.

The significant differences, other than the access arbitration process, signalling speeds, and signal format, between the IEEE 802.5 and 802.3 protocols that are relevant to the present invention are as follows. An 802.5 Token Ring network has a continuous stream of token packets on the network even if all of the attached stations do not have data to transmit. An 802.3 network is quiescent if all of the attached stations do not have data to transmit. The present invention is compatible with and accommodates both situations.

An important specification of operational standards for the IEEE 802.3 and 802.5 protocols is maximum bit error rates in transmission. In some circumstances, free space optical links can be more susceptible to transmission errors than physical media links. Therefore, it is important that an adequate signal-to-noise level be achieved before data are transmitted on a free space optical link and it is advantageous that a free space optical link be disabled and signals indicating non-operational status be generated if the signal-to-noise level subsequently falls below threshold. Also, it is especially advantageous to provide automatically and instantly an alternative path if an operating path becomes non-operational and to provide signals indicating routing to an alternative path when this occurs. It is also advantageous to restore automatically and instantly the network information flow to the original operating path when the link resumes ability to operate.

To establish a free space optical link, a node (node A) has means to direct light from a light source such as a light emitting diode to a second node (node B) and has means for gathering light transmitted from the second node (B) to a photo detector such as a photo diode. Also, each node has means for communication to its neighbor the following status information: node A informs node B, if it can, that the signal level from B to A is either satisfactory or else not satisfactory (and vice versa) and node A also confirms to node B, if it can, the status of signal levels received by node B from node A as communicated by B to A. The end result is that both A and B know whether or not the optical link between them is viable in both directions and both have means to cause the link to become non-operational if the link becomes non-viable in at least one direction.

Each node, which may have communication devices attached to it, has means to communicate with either a central hub or else with one or more other nodes, each of which may also have communication devices attached to them. Each node has means to measure the power level of received optical signals which are then compared with a reference level which is the minimum threshold for an adequate signal-to-noise ratio. Each node also has means to identify valid data signals (referred to as data packets) and to identify one or more status signals (for example, an alignment signal and a confirmed alignment signal). Each node has means to transmit data packet signals or one or more status signals. Each node has means to cause a free space optical link (either between a central hub and a node or between two nodes) to become non-operational if the link between it and its neighbor is non-viable in at least one direction. Each node has means to provide signals to attached communication devices of the operational status of all free space optical links emanating from the node.

The communication method between nodes is dependent on the topology of the network. There are two possibilities. In one version, the sequence of network communication is specified, i.e., there is a preferred direction of data packet flow; other direction(s) are alternative(s) path(s) if a link in the preferred direction is non-operational. In the second version, there is not necessarily a preferred direction or the preference may be determined either by at-the-moment availability or else by happenstance.

The control system logic for link maintenance is predicated on the notion or assumption that the normal status is one of viable two-way free space optical links between nodes. When a node is powered up for operation, it begins to transmit an alignment signal and it expects to receive an alignment signal from its line-of-sight neighbor. It is possible with line-of-sight optical links that an alignment signal is being received by the neighboring node above the threshold while the alignment signal from the neighboring node is not above the threshold. The link control system logic regards a link as not viable until signals from the first node to the second and from the second to the first are being received above threshold.

The link control system isolates the optical link from attached communication devices (or vice versa) while the link is not viable.

A node changes its transmitted signal from alignment to confirmed alignment when it receives any signal above threshold. A node transmits an alignment signal when it receives any signal below threshold. A node will not transmit packet data unless it has received either a confirmed alignment signal for a specified time interval or else packet data and, also, has been transmitting either packet data or else a confirmed alignment signal. A node will not pass on packet data for processing by attached communication devices if received signals are below threshold.

A first visual (or aural) signal indicates the power level of the received signal. A second visual (or aural) signal indicates the establishment of a viable two-way free space optical link.

In another embodiment of this invention, there are two channels for communication between optical nodes. One channel is for data packets. The second channel is for operational status signals. The channels can be separate optical wavelengths—one wavelength for data packets and a second for operational status—or two carrier frequencies —one for data packets and the other for operational status—on the same optical wavelength. Reference may be made to the above referenced patent applications for exemplary embodiments for providing multiple channels between optical nodes.

A node with free space optical links has means to short circuit the data path from its optical transmitter to its optical receiver when ever it receives signals on the affected optical link indicating that its transmitted signals are below the minimum power threshold of the recipient node.

WRITTEN DESCRIPTION OF PREFERRED EMBODIMENTS

It is known that communication devices such as computers can be linked to one another by a network. The present invention specifically references implementation on networks controlled by the protocols known as Carrier Sense Multiple Access/Collision Detect (CSMA/CD) (IEEE 802.3) or Token Ring (IEEE 802.5) but the invention will function equally well for most known network protocols. For purposes of this disclosure communication devices are connected to the network by means of devices called nodes. One or more devices can be connected to a node. Nodes communicate with each other by means of light. Pulses of light transmitted in a line-of-sight path between nodes provide the same function as electrical pulses on metallic conductors if computers are linked by wires or cables or as light pulses in optical fibers if computers are linked by optical fibers.

In one embodiment a node has two independent sets of an optical receiver and an optical transmitter and has means to communicate in two directions. One direction, the so-called operating direction, is from a specified node to a second node that is downstream in the normal flow of data packets, and the second direction, the so-called back-up path, is from the specified node to a third node that is upstream in the normal flow of data packets. The present disclosure uses the convention that the operational direction of data flow is from upstream to downstream. It will be recognized that the operational direction of data flow can be downstream to upstream as specified and that specified direction becomes the convention used for that installation.

Figure 1:
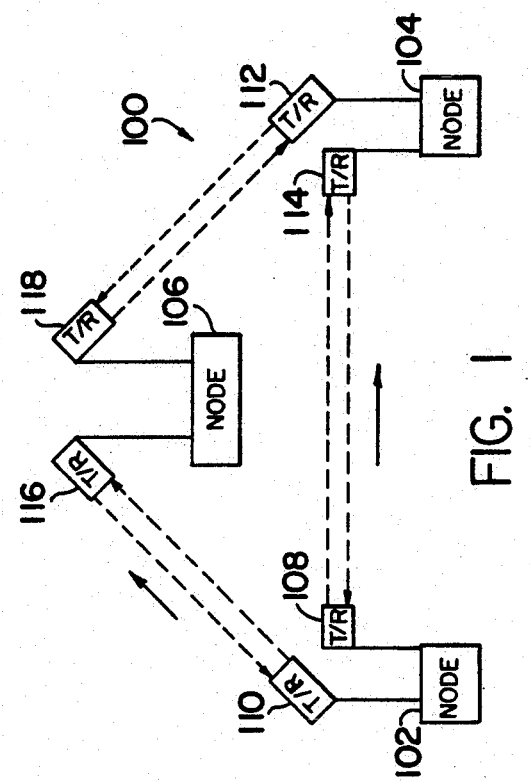
FIG. 1 is a schematic representation of a free space LAN wherein the nodes are arranged in a ring configuration.

As illustrated schematically in FIG. 1, three or more nodes can be linked in a ring generally designated 100 wherein every node has an upstream neighbor and a downstream neighbor. The so-called operating free space optical path is used to convey data packets from one node to the next in the direction as indicated. Either direction can be operational, although in some instances administrative practices may mandate a specific direction as the preferred operating direction. The second optical path is available as a back-up if the operational path becomes non-operational. The advantage of such a configuration is that if an optical link between two nodes becomes impaired the nodes can continue to send data packets along the back-up path such that the operation of the network is uninterrupted.

In FIG. 1, the ring 100 includes nodes 102, 104 and 106 and each node communicates with an upstream and downstream neighbor by means of an optical transmitter and optical receiver. For example, node 102 communicates with its upstream neighbor node 104 via the optical transmitter/receiver 108 and communicates with its downstream neighbor node 106 via the optical transmitter/receiver 110. Likewise, node 104 communicates with its upstream neighbor node 106 via the optical transmitter/receiver 112 and communicates with its downstream neighbor node 102 via the optical transmitter/receiver 114. It can be seen that node 106 communicates with its respective upstream and downstream neighbors via the optical transmitter/receiver 116, 118, respectively.

Figure 2:
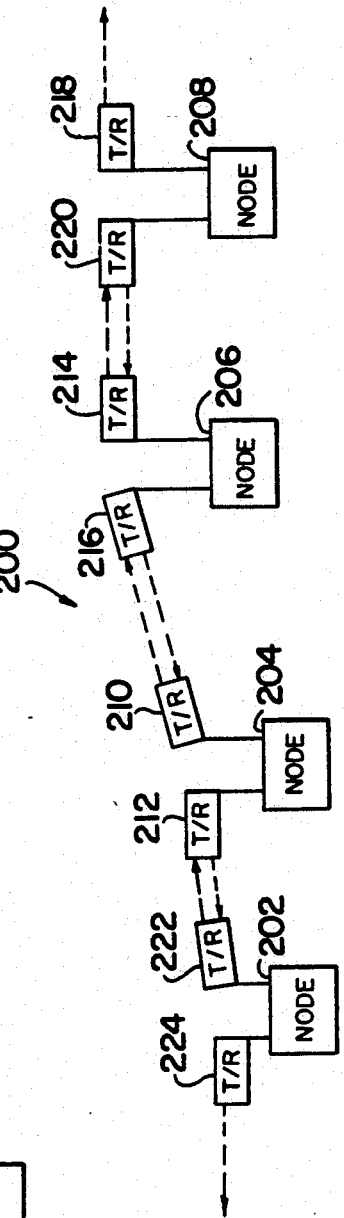
FIG. 2 is a schematic representation of a free space LAN wherein the nodes are arranged in a string configuration.

As illustrated schematically in FIG. 2, two or more nodes can be linked in a string generally designated 200 wherein the nodes at the ends of the string have only one neighbor. The back-up link is used to complete a ring such that all nodes are in the network if the protocol in use is Token Ring. If an optical link between two nodes becomes impaired, the string becomes two strings. It can be seen that when many nodes are to be configured into a ring, the configuration is a series of strings until all of the optical links become established. When the ends of two strings become linked, the result is a larger string. When the ends of the remaining string become linked, the string becomes a ring.

In FIG. 2, the string 200 includes nodes 202, 204, 206 and 208 and each node except for the end nodes 202 and 208 communicate with an upstream and downstream neighbor by means of an optical transmitter and optical receiver. For example, node 204 communicates with its upstream neighbor node 206 via the optical transmitter/receiver 210 and its downstream neighbor node 202 via the optical transmitter/receiver 212. It can be seen that node 206 communicates with its respective upstream and downstream neighbor nodes 208 and 204 via the optical transmitter/receivers 214, 216, respectively.

The link maintenance and control system of a node is described as follows wherein R signifies a receiver, T signifies a transmitter, U signifies upstream with respect to the operating direction and D signifies downstream. Upstream and downstream imply either an a priori specified preferred direction for flow of data packets or else an existing direction for the flow of data packets. At the time of initial installation it may be that none of the directions available is specified as operational. This situation has no effect on the alignment process because the designations "upstream" and "downstream" are arbitrary and interchangeable.

"L" signifies any signal received below a predetermined threshold level including no signal. "S1" signifies an alignment signal. "S2" signifies a confirmation signal indicating that either an alignment signal is being received above the predetermined threshold level or else data packet signals are being received above the predetermined threshold. "S3" signifies data packets.

A link between nodes can be in one of three states: alignment (which includes off), confirmed alignment, and operational. The sequence in which a link can change states is specific and is illustrated in the state diagram of FIG. 3a. A link must start in the alignment state. A link can be changed from an alignment state to a confirmed alignment state via a process described below. A link in the confirmed alignment state can then either revert to the alignment state or be changed to the operational state. While in the operational state, a link may revert to the alignment state. A link cannot change from an alignment state to an operational state or from an operational state to a confirmed alignment state. A link can change from the alignment state to only the confirmed alignment state and from the operational state to only the alignment state.

A link is in the alignment state when either of the optical paths (to or from directions) between downstream and upstream neighboring nodes is not viable. A node cannot transmit data packets on a link when the link is in the alignment state. Also, a link is isolated from any communication devices attached to the node (or vice versa) when the link is in the alignment state. The logical conditions specifying the alignment state are: The downstream receiver or the upstream receiver or both either are receiving any signals (S1, S2, or S3) below the threshold level or else are receiving an alignment signal S1. The downstream and upstream transmitters transmit alignment signals S1 when they are powered up but not aligned.

The confirmed alignment condition is a transitory state that exists when a viable two-way optical link between two adjacent nodes has been established. Data packets cannot be transmitted between two nodes without the link between them having first been in a confirmed alignment state.

Alignment is achieved by directing an optical transmitter at the upstream end of the link to its counterpart optical receiver at the downstream end of the link and vice versa and similarly directing an optical transmitter at the downstream end of the link to its counterpart receiver at upstream end of the link. Each optical receiver provides an indication of the amount of optical power being received to assist the person performing the installation. During this process, transmitters at both ends of the link send alignment signals S1. When the downstream end of the link receives power above the threshold level, it stops sending alignment signals S1 and begins sending confirmed alignment signals S2 to the upstream end of the link. The end of the link upstream now knows that its transmitter is aligned with the downstream receiver and that all signals it transmits upstream will be received with sufficient strength to insure an acceptable bit error rate. When the end of the link upstream receives confirmed alignment S2 signals above the threshold it transmits confirmed alignment signals S2 to the end of the link downstream. When the end of the link downstream begins to receive confirmed alignment signals S2 after having previously received alignment signals S1 it knows that all signals it transmits upstream will be received with sufficient strength for an acceptable bit error rate. When an end of a link is receiving signals S2 and is sending signals S2 it provides an indication that an optical link has been established. These signals are used by the operator to verify the status of the link.

The logical conditions and sequence specifying a confirmed alignment state between two ends of a link are: the receiver at the downstream end is receiving alignment signals S1 above the threshold level and the transmitter at the downstream end stops sending alignment signals S1 and begins sending confirmed alignment signals S2 to the upstream end. If the receiver at the upstream end is receiving confirmed alignment signals S2 below the threshold level it continues to send alignment signals S1; if the received S2 signals are above the threshold level, the transmitter stops sending alignment signals S1 and begins sending confirmed alignment signals S2 to the downstream end. An alignment confirmed state or condition for a link exists when receivers at both ends of the link are receiving confirmed alignment signals S2 above threshold.

If, subsequently, signals from upstream to downstream or from downstream to upstream or signals in both directions fall below the threshold, the end of the link receiving low signals sends alignment signals S1 to the other end of the link which, in turn, begins to send alignment signals S1 on the return path. (With this decision process, the lack of a signal or an insufficient signal is equivalent to alignment signal S1.) Both ends of the link now know that the link is non-operational. Both nodes provide a signal to the operation when the link between them becomes impaired. If the problem is temporary, such as when a person momentarily blocks the line-of-sight path, the alignment process (realignment, in actuality) described above will begin automatically when the problem is resolved. This follows from the fact that the expected state is one of a viable two-way channel between ends of a link.

All communication devices connected to a node are isolated from alignment signals S1 and confirmed alignment signals S2; that is, these signals are not in the network's data path. Communication devices are not inserted into the network's data path until alignment of at least one link has been confirmed and after a predetermined time delay, for example, a five second time delay. The purpose of the time delay is to compensate for the difference in the electronic switching speeds and the physical process of humans moving the optical elements to achieve alignment. The alignment process consists of sweeping the transmitter and receiver optics through a small sector. The operator, generally, will overshoot the optimum alignment at least once. However, the electronic circuits performing the decision making and switching operate much faster and could enable the node to transmit packets during the interval, perhaps a second or so that the link is in alignment and prior to the overshooting occurring. Repetitive status changes between alignment and operational can be disruptive to the overall operation of the network and should be avoided, therefore the time delay is necessary before the communication devices are inserted.

All communication devices attached to a node that have been inserted in the network's data path are immediately removed from the data path when either the upstream or downstream receivers of a link begin receiving alignment signals or signals S2 or S3 below the threshold level.

As described previously, the confirmed alignment state is a transitory state between the alignment state and the operational state. The operational state has three sub-states which are described below. It should be remembered that nodes can have an upstream and a downstream neighbor and are equipped with two sets of optical receivers and transmitters and, therefore, can communicate in two directions: upstream and downstream.

Two of the operational sub-states are so-called "wrap-to-back-up direction" and "wrap-to-operating direction". A wrap state exits when one and only one of a node's two links has alignment confirmed with its neighbor. Wrap-to-back-up direction is established by the upstream node and wrap-to-operating direction is established by the downstream node when the optical link between the two nodes becomes impaired. A wrap state is also established by an isolated node in alignment state when it becomes optically linked to an end of a string of nodes, thereby increasing the length of the string. A node concurrently in a wrap-to-back-up state and in a wrap-to-operational state is in isolation.

It is assumed that within a time interval of approximately one microsecond, only one node in the network will become the object of a failure in an optical ring or string; that is, in any one microsecond interval either one link between two nodes becomes impaired or the two links from a node to its respective upstream and upstream neighbors become impaired.

The logical conditions specifying the state of wrap-to-operating direction for a node are: the node's upstream receiver begins receiving any signal S1, S2, or S3 below the threshold or alignment signals S1 and the node's downstream receiver is receiving above the threshold either confirmed alignment signals S2 or packet data signals S3. (It needs to be emphasized that two optical links are involved: a path to node from its downstream neighbor and a path to the node from its upstream neighbor). When one of the logical conditions occurs, the generator of alignment signals S1 in the node is connected to the upstream transmitter and the downstream transmitter is driven by the generator of confirmed alignment signals S2 in the node unless packet data signals S3 are being received by the downstream receiver, in which case the downstream transmitter is driven by the received packet data signals S3. When a communication device is inserted into the network's data path, the output of the communication device preempts the output of the generator of confirmed alignment signals S2 and the downstream transmitter is driven by the packet data emanating from the communication device. Also a register in the node is set indicating the direction of flow of packet data.

The logical conditions specifying the state of wrap-to-back-up direction are: the downstream receiver begins receiving any signal (S1, S2, or S3) below the threshold or alignment signals S1 and the upstream receiver is receiving above the threshold either alignment confirmed signals S2 or else data packet signals S3. The generator of alignment signals S1 in the node is connected to the downstream transmitter and the upstream transmitter is driven by the generator of alignment confirmed signals S2 in the node unless data packet signals S3 are being received by the upstream receiver, in which case the upstream transmitter is driven by the received data packet signals S3. When a communication device is inserted into the network's data path, the output of the device preempts the output of the generator of alignment confirmed signals S2 and the transmitter is driven by the packet data emanating from the communication device. Also the direction of flow of packet data is stored in the register.

The third operational state exists when both links of a node are confirmed aligned with respect to the node's two neighboring nodes. In this state, a node can transmit packet data in the operating direction and transmit confirmed alignment signals in the back-up direction if the configuration is a ring or, in the case of a string configuration transmit packet data in the operating direction and in the back-up direction. If no packet data are on the network, confirmed alignment signals are transmitted in both directions.

The logical conditions specifying the two versions of an intermediate operation state link are: a node's upstream receiver is receiving above the threshold level either confirmed alignment signals S2 or packet data signals S3 and the node's downstream receiver is receiving above the threshold level either confirmed alignment signals S2 or packet data signals S3. If data packet signals are being received from upstream, the operational direction is stored in the register.

If a communication device is inserted in the network's data path, the upstream transmitter is driven by the output of the generator of confirmed alignment signals S2 in the node until packet data signals S3 are received by the downstream receiver at which time the upstream transmitter is driven by the downstream receiver. Upstream and downstream are determined by the direction of flow of data packets which direction is stored in the register.

If a communication device is not inserted in the network's data path, the downstream transmitter is driven by the output of the generator of confirmed alignment signals S2 in the node until the upstream receiver receives packet data S3 at which time the downstream transmitter is driven by the upstream receiver and, simultaneously, the downstream transmitter is driven by the output of the generator of confirmed alignment signals S2 in the node until packet data signals S3 are received by the downstream receiver at which time the upstream transmitter is driven by the downstream receiver.

If a communication device is inserted in the network's data path, the output of the upstream receiver becomes the input to the device and the output of the device drives the downstream transmitter.

A ring configuration of nodes is compatible with Token ring protocol. Nodes used in a ring configuration can be made to be compatible with the CSMA/CD protocol with minor modifications to the electronic control system and by adding a collision detection function.

The CSMA/CD protocol stipulates that a data communication device can transmit in a broadcast fashion to all data communication devices that are on the LAN after it has sensed that no other devices are transmitting on the network. This requires that the electronic control system in a node make available to all data communication devices that are attached to the node an indication of whether or not S3 data packet signals are being received by the node. Also, the electronic control system must provide means to prevent S3 signals that have circulated around the ring and have returned to the upstream side of the originating node from being incorrectly detected as a collision by the originating data communication device. A first method to accomplish this is to incorporate in the control system collision detection logic that is described in the above referenced applications. A second method is to enable the control system to disconnect the link between the output of the upstream optical receiver and the input to the data communication device while the device is transmitting.

Also, in nodes that are not the originating node, the electronic control system must pass on to attached devices all S3 signals received by the upstream optical receiver and simultaneously drive the downstream optical transmitter with the received S3 signals.

The control system and logic for reconfiguring and restoring a network operating under CSMA/CD is the same as with Token Ring.

Figure 3:
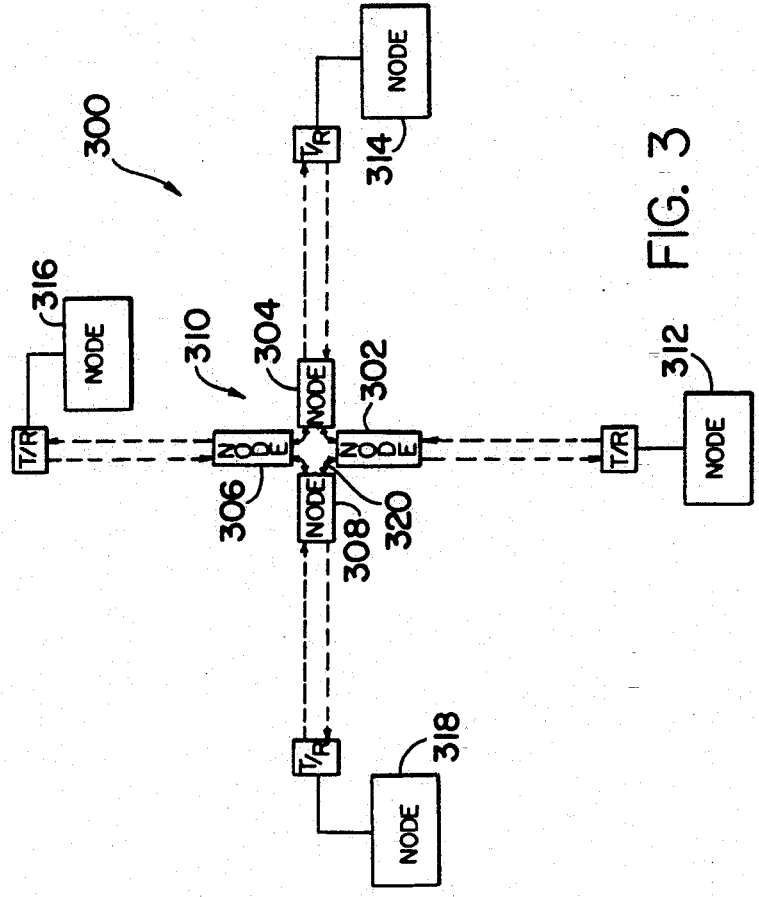
FIG. 3 is a schematic representation of a free space LAN wherein the nodes are arranged in a star configuration.
Figure 3A:
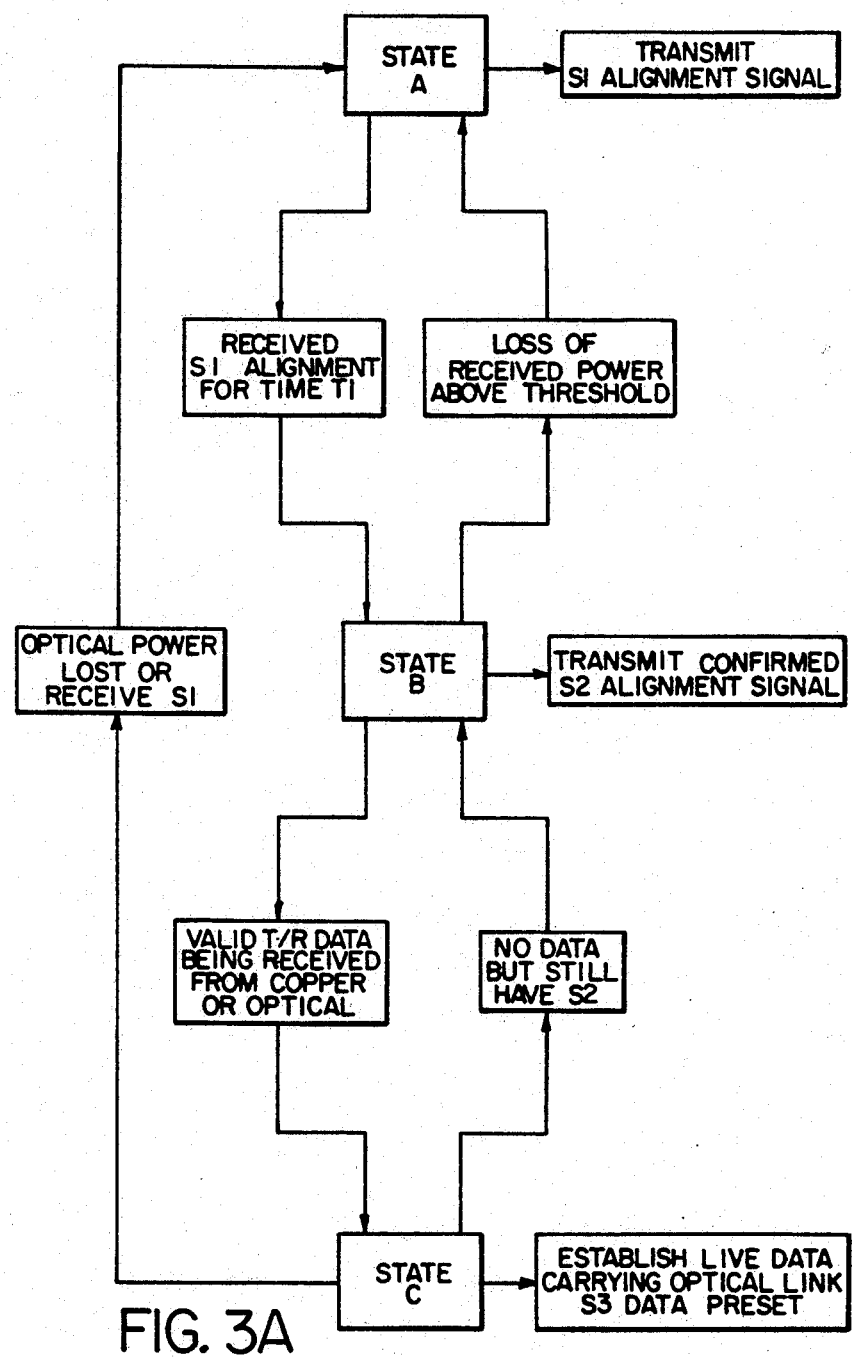
FIG. 3a is a state diagram of the changes in state of a link connecting adjacent nodes.

Turning now to FIG. 3, a Token Ring network in a star configuration, designated generally as 300, is a special case of the present invention. Each node has only one-way optical communication for network information. It is seen that each mode 302, 304, 306, 308 at the central hub generally 310 can be linked to no more than one node of the nodes 312, 314, 316, 318 on the periphery. It is possible that a hub node has no partner on the periphery to link with or a periphery node has no partner at the hub. Communication devices can be attached to periphery nodes but they cannot be attached to hub nodes. Hub nodes are linked to each other such that signals received by a hub node from its partner on the periphery becomes the input to the upstream node at the hub to be transmitted to the downstream's partner at the periphery. For example, hub node 302 may received a signal from its peripheral partner node 312 which signal is coupled to the input 320 of the hub node 308 which is turn transmits the signal downstream to its peripheral partner node 318.

A system to control the optical links for these node pairs can be less complex than the system required to control the optical links between bi-directional nodes. The following describes a control system for this special case, where only one kind of an alignment signal is required instead of two.

An operating Token Ring LAN has a continuous bitstream circulating. This means that with a sun as a central hub for one or more satellites, the communication between a sun and a satellite is full duplex, i.e., the sun and satellite are simultaneously receiving and sending optical signals to each other.

As with a LAN with bi-directional nodes, it is possible for a variety of reasons that the optical link from a sun to a satellite can be satisfactorily functional while the corresponding optical link from the satellite to the sun is not, or vice versa. Satisfactorily functional in this context means that optical signals are being received with sufficient strength to insure an adequate signal-to-noise ratio, i.e., the information being received can be decoded without error. Whenever either or both optical links between a sun and a satellite becomes impaired, it is necessary that both sun and satellite "short circuit" their optical links and "short circuit" their electronic data links, thereby converting a malfunctioning larger ring into two smaller functioning rings. The short circuiting of electronic data links is generally referred to as "wrap-around" in the Token Ring LAN art and it must be completed within a few milliseconds of a link becoming impaired.

One method for achieving a wrap around is as follows. When a satellite is not receiving an optical signal from a sun, it transmits an alignment signal to the sun. The pattern of pulses in the alignment signal is different than the pattern of pulses in a normal Token Ring bitstream and the sun has the ability to distinguish between the two patterns. The sun responds to transmitting an optical signal to the satellite if the signal received from the satellite is above a specified threshold. The threshold is established at a minimum signal-to-noise level for error free operation. The signal transmitted by the sun to the satellite is an alignment signal similar to the alignment signal from the satellite. If the signal received by the sun is not sufficient in strength, no signal is sent to the satellite. The satellite has a visual indicator that displays the strength of the signal it receives. If there is no returned signal, the operator knows that the alignment of either the sun or satellite or both must be improved.

An optical link between a sun and a satellite is unnecessary if at least one of the communication devices connected to the satellite is not active. When such an inactive device becomes active, it automatically generates a data bitstream. When the data bitstream is generated, the satellite will optically transmit the data bitstream to the sun. If the signal received by the sun is above the threshold, the sun transmits the bitstream on its electronic ring path, and as the electronic signals complete their circuit of the ring, they are optically transmitted to the satellite. If the signals received by the satellite are not above the threshold, the satellite short circuits its electronic path and transmits an alignment signal to the sun. The sun, upon receiving an alignment signal, short circuits its electronic path and transmits an alignment signal to the satellite. If the signals received by the satellite are above the threshold, the bitstream is transmitted on the electronic path and the ring is now complete and functional. If, subsequently, either the satellite or the sun receive signals below the threshold, it short circuits its electronic path and optically transmits alignment signals. The receiving device then short circuits its electronic path and transmits alignment signals. One ring has now become two rings due to the short circuiting of both electronic paths. The alignment process is then repeated and when completed, the short circuits are removed and the two opened rings are linked into one closed ring.

In another embodiment of the star configuration, a satellite and sun always transmit optical signals, either a bitstream or an alignment signal. When an alignment signal is transmitted, the electronic path is short circuited. The received signal also drives a visual indicator of signal strength which is used to optimize the alignment of the optical node with respect to the counterpart optical node. A second visual indicator signifies the state of the received signal being above the threshold. If either the satellite or sun has a bitstream to transmit, it does so only when the strength of signals it is receiving is above the threshold, otherwise it continues to send alignment signals.

A satellite transmits a bitstream because a communication device which is connected to it wants to insert on the ring. The sun repeats the bitstream to the satellite if the signals received from the sun are above the threshold. When the satellite receives the bitstream, it knows that its signals are above the threshold at the sun and the sun already knows that its signals are above threshold at the satellite otherwise the satellite would not have transmitted a bitstream. Both now open their short circuits of their respective electronic paths and the ring is functional.

If, subsequently, the signals to the satellite fall below the threshold, the satellite ceases sending a bitstream and sends an alignment signal to the sun and both devices short circuit their respective electronic paths and the threshold indicator on the satellite shows that the received signals are below the threshold. The satellite resumes sending a bitstream to the sun at which point the process is at the stage as described above.

If, subsequently, the signals to the sun fall below the threshold, the sun will transmit alignment signals to the satellite and both devices short circuit their respective electronic paths and the threshold indicator on the sun shows that the received signals are below threshold.

If, subsequently, the communication device attached to the satellite de-inserts, the satellite transmits an alignment signal to the sun and both devices short circuit their respective electronic paths and the sun transmits an alignment signal to the satellite.

If, on the other hand, the sun transmits an alignment signal instead of a bitstream, the sun maintains the short circuit of its electronic path and the satellite knows its signals are not above the sun's threshold and the satellite, too, maintains the short circuit of its electronic path. The satellite continues to transmit a bitstream. The threshold indicator on the sun shows that the signals received by the sun are below threshold.

In another embodiment of the invention, there are two channels for communication between optical nodes as disclosed in the above referenced patent applications. One channel is for a bitstream. The second channel indicates whether or not signals being received are above threshold. The channels can be separate optical wavelengths—one wavelength for the bitstream and the second for signal strength indication. Preferably, two carrier frequencies, one for the bitstream and the other for signal strength indication are on the same optical wavelength. An optical node short circuits its electronic data path whenever it learns that its signals are not above the recipient's threshold.

Figure 4:
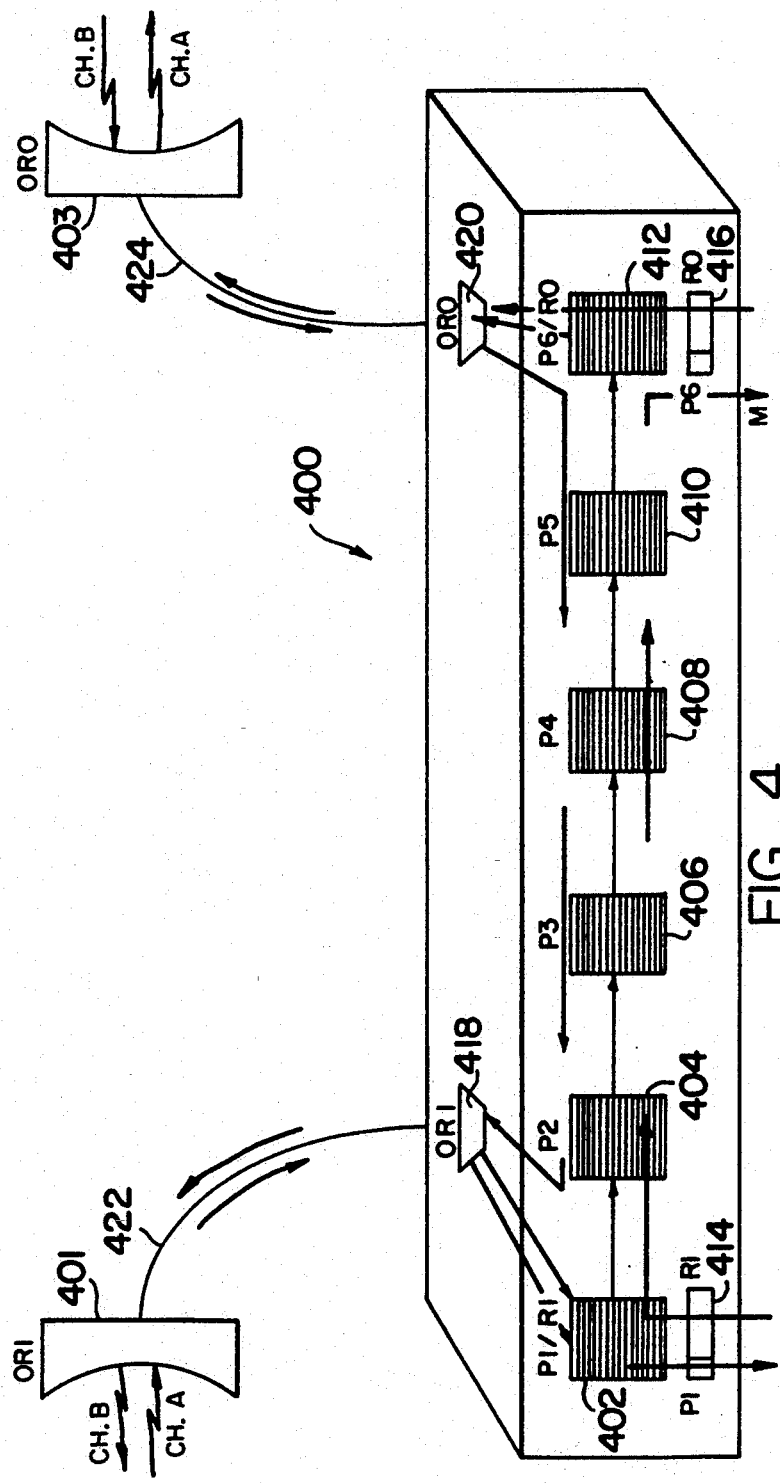
FIG. 4 illustrates schematically a base unit embodying the present invention for automatically reconfiguring the data paths in a free space local area network (LAN) system and having an upstream and downstream optic element attached.

Turning now to FIG. 4, a switchable base unit forming a node of the present invention is schematically illustrated and generally designated 400. FIG. 4 shows the base unit with two optic elements ORI 401 and ORO 403 and six workstation connections or six data connectors 402, 404, 406, 408, 410 and 412. The end two connectors 402,412, respectively are labelled P1/RI or Port 1/Ring-in and P6/RO or Port 6/Ring-out and each have associated a respective switch 414,416. The switch 414,416 configures its respective data connector 402,412 for either a port configuration, which is the configuration used to connect a workstation, or a network expansion connector which is referred to herein as the ring-in and ring-out connectors, respectively ring-in being 402 and ring-out being 412. The two end connectors 402,412 can be configured for either network expansion, i.e. ring-in or ring-out or as ports, Port 1 or Port 6. Ports 2, 3, 4 and 5 are dedicated data connectors 404, 406, 408, 410, respectively in which only workstations can be attached. The optical ring-in connector 418 and the optical ring-out connector 420 serve the same purpose as the ring-in and ring-out ports 402,412 with the difference being that expansion of the LAN is done through optic elements ORI 401, ORO 403 so the function of the base unit serves as two ring-ins and two ring-outs. Considering the data path through the system configured as shown in FIG. 4, optical channel A and optical channel B are illustrated near optical ring-in element ORI 401 and optic ring-out element ORO 403. The end two data connectors 402, 412 are configured for port 1 and port 6, respectively, that is, they are configured for workstation connections. Data is shown entering on channel A to the upstream optic element ORI 401 from the optical domain and is coupled via lead 422 to the optical ring-in or ORI connector 418 on the base unit 400. Channel A data enters port 1 (data connector 402) and is routed through ports 2 through 5 (data connectors 404, 406, 408, 410) where it then is routed directly to port 6 (data connector 412) to the optical ring-out or ORO connector 420, to the downstream optic element ORO 403 via 424 for transmission in the downstream direction and into the optical domain.

Figure 5:
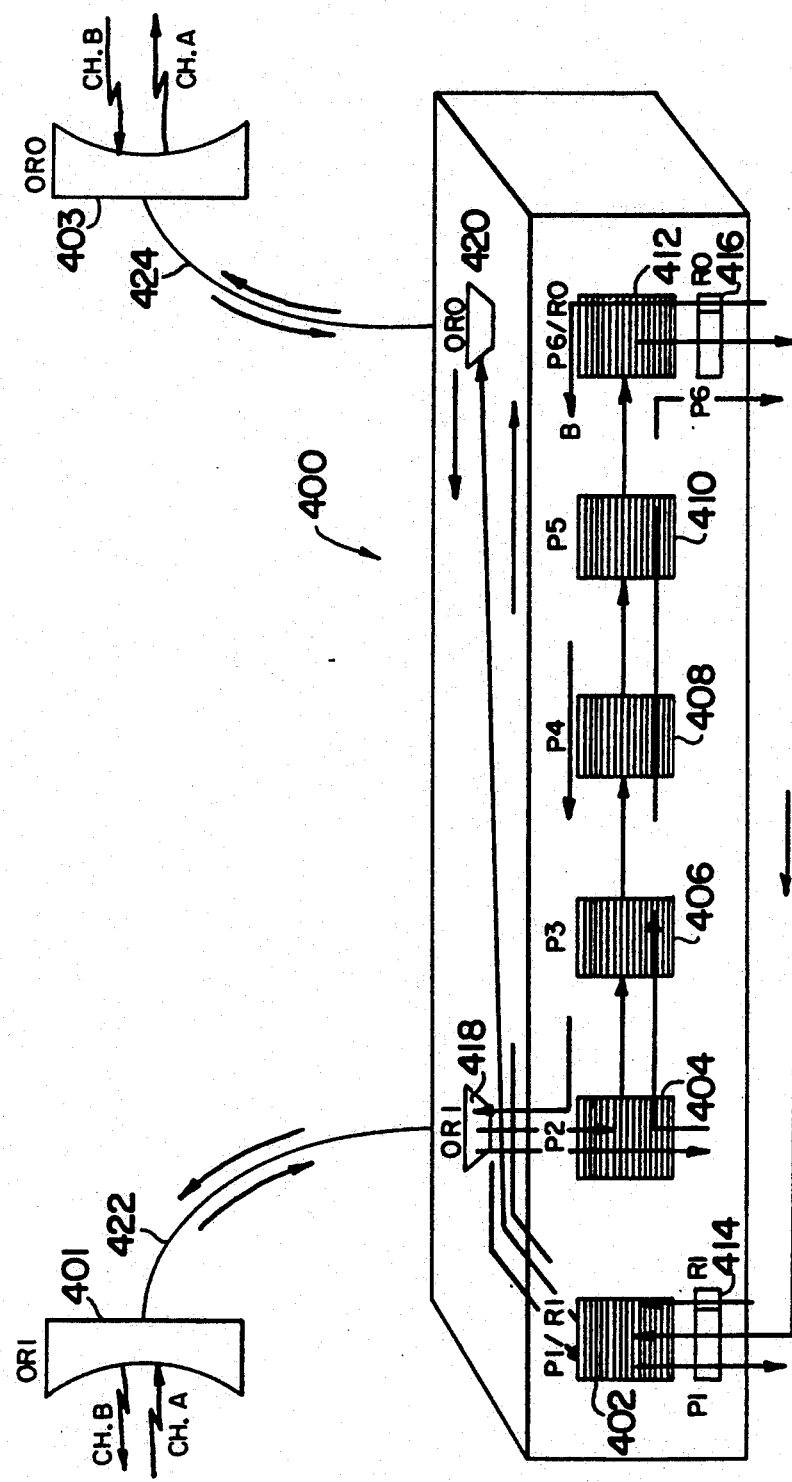
FIG. 5 illustrates the base unit of FIG. 4 switched to a ring-in/ring-out configuration.

Referring to FIGS. 5-11, various data paths and configurations for the base unit 400 are schematically illustrated for conditions based on whether both optic elements ORI 401, ORO 403 are both present or either one or the other is present, as well as the configuration of the end two data connectors 402,412 being either configured for ports or network expansion, i.e. ring-in/ring-out. FIG. 5 shows the basic system configuration with the upstream optic element ORI 401 and the downstream optic element ORO 403 both being in the data path. The respective switches 414,416 are operated to the RI,RO positions respectively to configure the end data connections 402,412 for Ring-in and Ring-out. Considering the data path through the system configured as shown in FIG. 5, optical channel A and optical channel B are illustrated near upstream optic element ORI 401 with channel A being considered a main ring and channel B being considered a backup ring, respectively. Data is shown entering on channel A to the upstream ORI 401 from the optical domain and is coupled via lead 422 to the ORI connector 418 on the base unit 400. Channel A data enters the ORI connector 418 and is routed into data connector 404 through data connectors 406, 408, 410 to the ring-out port 412. Externally it is assumed that there is a data path which eventually ends up back to this particular base unit 400 on Port 1/Ring-in data connector 402 which is configured for Ring-in where the data is then routed to the downstream optic element ORO 403 for transmission in the downstream direction. The path for channel B or the backup ring is similar but opposite to the path for channel A. Data enters the downstream optic element ORO 403 from the downstream optical domain and is coupled via lead 424 to the ORO connector 420, travels through the base unit 400 and then externally out the ring-in port 402. It is assumed that the data on channel B follows a data path externally somewhere in the network that returns back through the ring-out port 412 on the base unit 400 and then travels directly to the ORI connector 418 bypassing ports 2 through 5 (data connectors 404, 406, 408, 410) and to the upstream optic element ORI 401 via lead 422.

Figure 6:
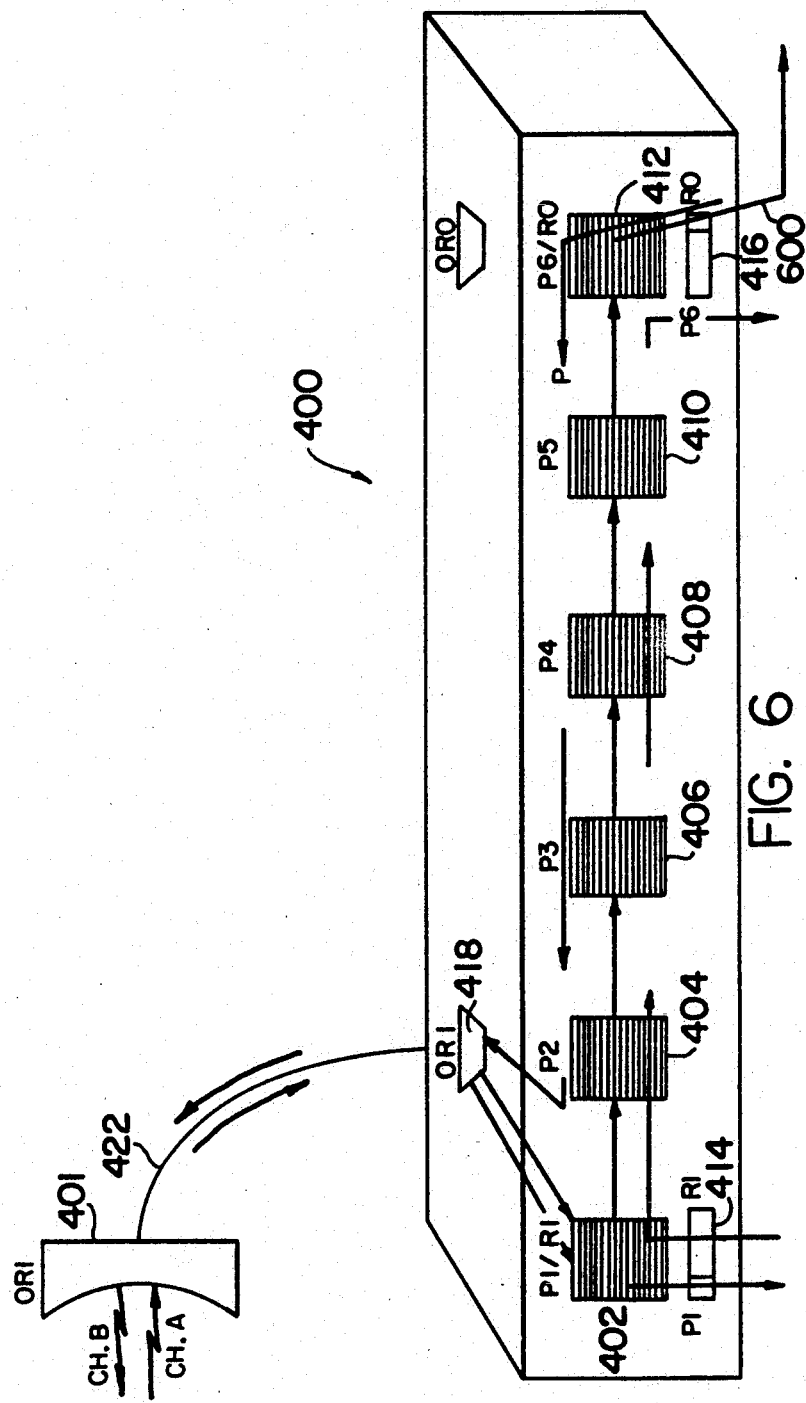
FIG. 6 illustrates the base unit of FIG. 4 with a single optic element and switched to a ring-out configuration.

Considering now FIG. 6, a configuration called IR IN and CU or copper out is illustrated wherein only the upstream optic element ORI 401 is present. The switch 414 is operated to its P1 position to configure data connector 402 as a workstation port. The switch 416 is operated to its RO position to configure the data connector 412 as a ring-out connection. It is assumed there is a copper or metallic connection from data connector 412 to the network, the network being the outside world beyond the optical domain. Data on channel A from the optical domain enters the upstream optic element ORI 401, is coupled via lead 422 through the ORI connector 418, to the port 1 (data connector 402), through ports 2 through 5 (data connectors 404, 406, 408, 410) and directly into port 6 (data connector 412) where the data is then routed to the outside world via a standard copper interconnection cable 600. The switch 416 is operated to its RO position to configure data connector 412 as a ring-out port. It is not assumed that the path taken by the cable 600 ends up back at the base unit 400. However, it is assumed that at some point within the network configuration the data does return to the optical domain.

Figure 7:
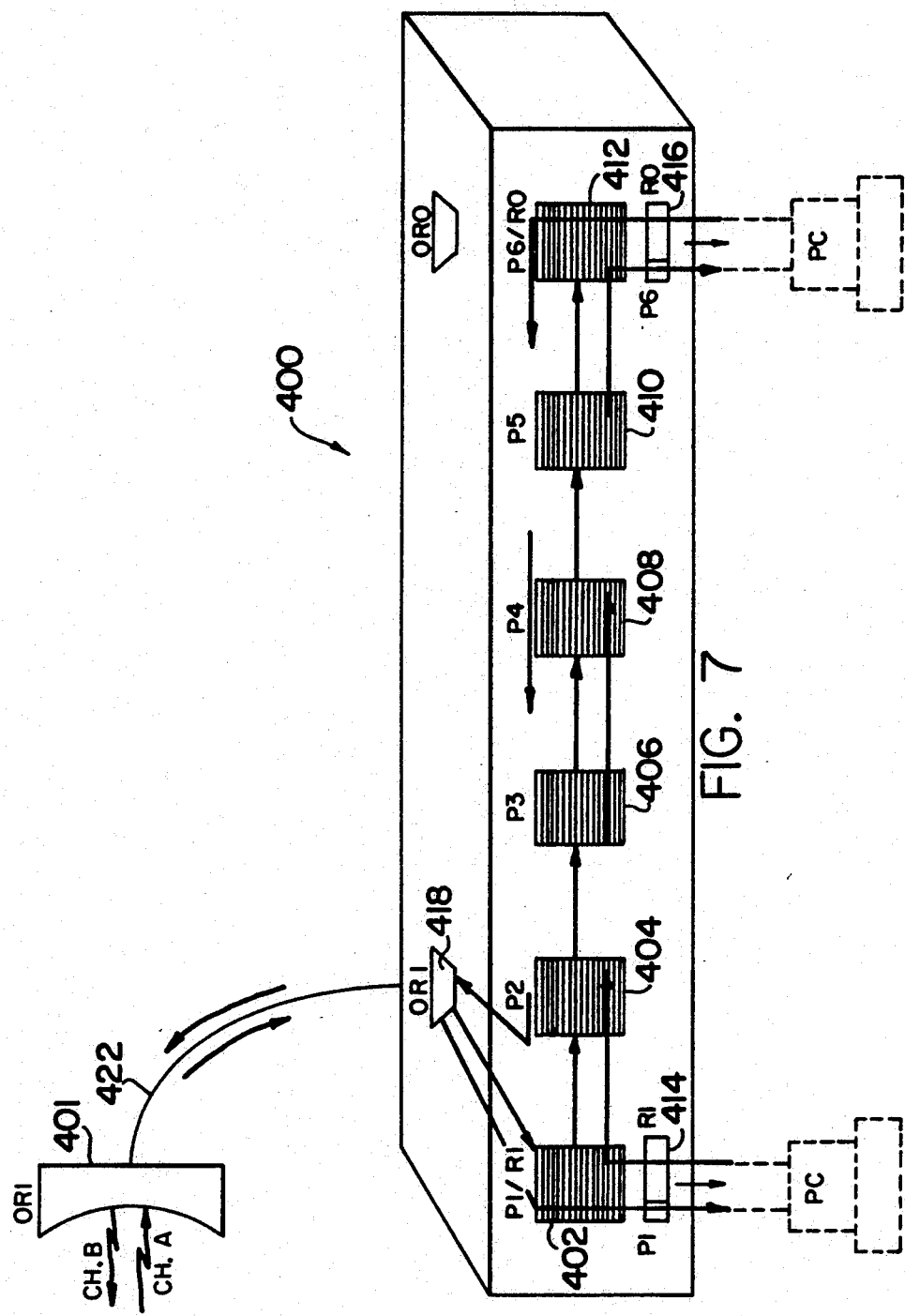
FIG. 7 illustrates the base unit of FIG. 4 with only an upstream optic element attached and switched to a port configuration.

Turning now to FIG. 7, a configuration called IR IN only is illustrated wherein data on channel A enters the upstream optic element ORI 401, is routed into the base unit 400 through the ORI connector 418 and then routed directly to port 1 (data connector 402) which is configured for workstation attachment, i.e. the switch 414 is operated to its p1 position. The data is then routed through ports 2 through 5 (data connectors 404, 406, 408, 410) and into port 6 (data connector 412) which is also configured for workstation connection, i.e. the switch 416 is operated to its p6 position. The data path on port 1 and port 6 (data connectors 402, 412, respectively) is shown going out the base unit 400 and back in through the data connector 402. It is assumed that there is a workstation (shown in dashed lines) connected to the data connector 402 via a copper cable. The ports P2 through P5 (data connectors 404, 406, 408, 410) can, if there is a workstation cable attached to the data connectors, assume the same configuration as data connector 402. If a workstation is attached through a copper cable to data connector 412, the data is returned through port 6 (data connector 412) into the ORI connector 418 and to the upstream optic element ORI 401 via the cable 422 for transmission upstream on channel B. It should be noted that there is no actual backup data path as both paths are used in this configuration.

Figure 8:
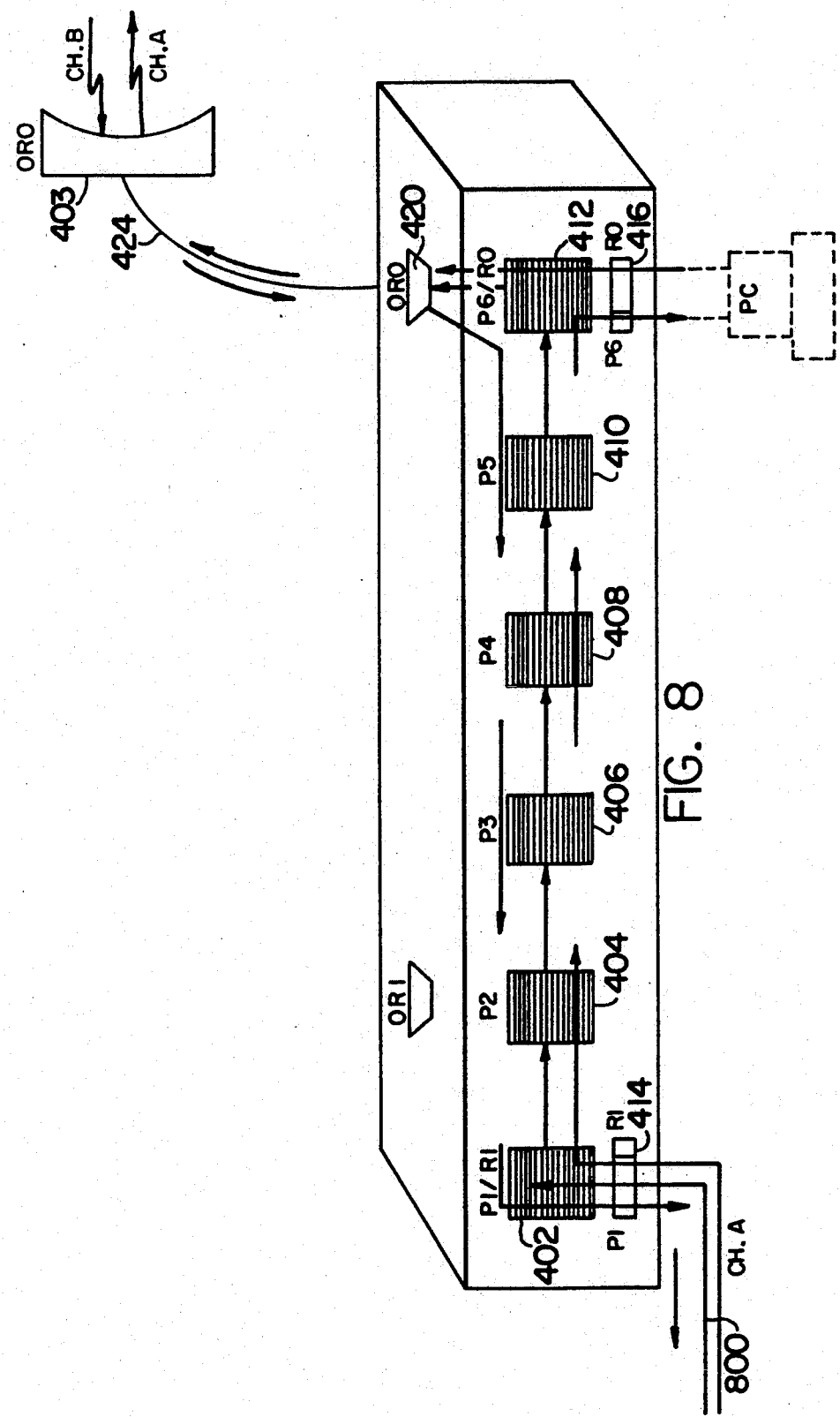
FIG. 8 illustrates the base unit of FIG. 4 with only a downstream optic element attached and switched to a ring-in configuration.

Turning now to FIG. 8, the exact reverse scenario from FIG. 6 is illustrated. The downstream optic element ORO 403 is coupled to the base unit 400 and no upstream optic element ORI is present. The data from channel B from the downstream optical domain enters the base unit 400 through the ORO connector 420, passes directly and immediately to the data connector 402 without going through the other data connectors 404, 406, 408, 410. The data connector 402 is in the Ring-in configuration for network expansion and it is assumed that there is a copper cable 800 connected from the external network into the base unit 400. Channel B data from the downstream optic element ORO 403 is passed directly through the base unit 400 and out the data connector 402. Data entering channel A from the copper domain via cable 800 connected to the data connector 402 enters that data connector and is routed through ports p2 through p6 (data connectors 404, 406, 408, 410). Port 6 (data connector 412) is configured for the workstation connection, i.e. the switch 416 is operated to its P6 position. Again it is assumed that there is a copper cable connecting the workstation (shown in phantom) which would then provide the return path for the data back into the data connector 412 where the data is then routed directly to the downstream optic element ORO via the ORO connector 420 and cable 424 for transmission optically downstream on channel A. If there is no pc workstation connected to the data connector 412, the data flow through the data connector 412 would appear as it would on any of the other ports 2 through 5 (data connectors 404, 406, 408, 410), and would pass directly through the data connector 412 and out the ORO connector 420.

Figure 9:
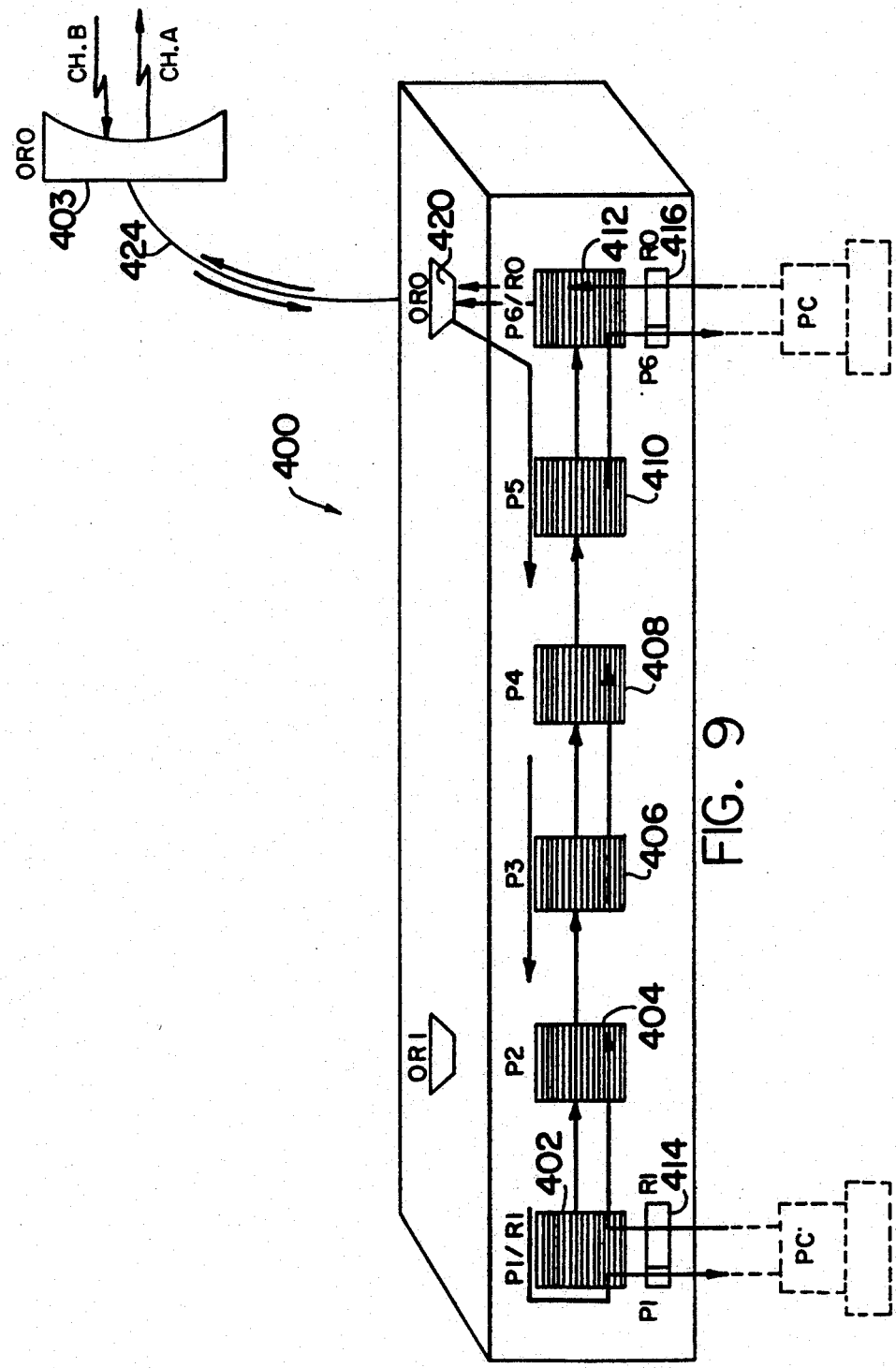
FIG. 9 illustrates the base unit of FIG. 4 with only a downstream optic element attached and switched to a port configuration.

Referring now to FIG. 9, the configuration illustrated is opposite the configuration illustrated in FIG. 7. Only the downstream optic element ORO 403 is present and coupled to the base unit 400. The data flow is in from the optical domain on channel B to the ORO connector 420, directly and immediately to the data connector 402 which is configured as a port for connection to a workstation shown in phantom, i.e. the switch 414 is operated to the p1 position. It is assumed that there is a copper cable connecting the pc workstation to the data connector 402 which provides the return data path into the data connector where the data is routed from port p2 (data connector 404) directly to port p6 (data connector 412). The data connector 412 is in the workstation configuration, i.e. the switch 416 is operated to the P6 position. Again it is assumed that there is a copper workstation connection cable attaching a pc workstation (shown in phantom) to the data connector 412. If the pc work-station is missing, the data will wrap through the data connector 412 as is shown for ports 2 through port 5 (data connectors 404, 406, 408, 410). Data at port 6 (data connector 412) is then routed directly to optical ring-out ORO connector 420 where is routed to the downstream optical node ORO for transmission on channel A in the optical domain.

Figure 10:
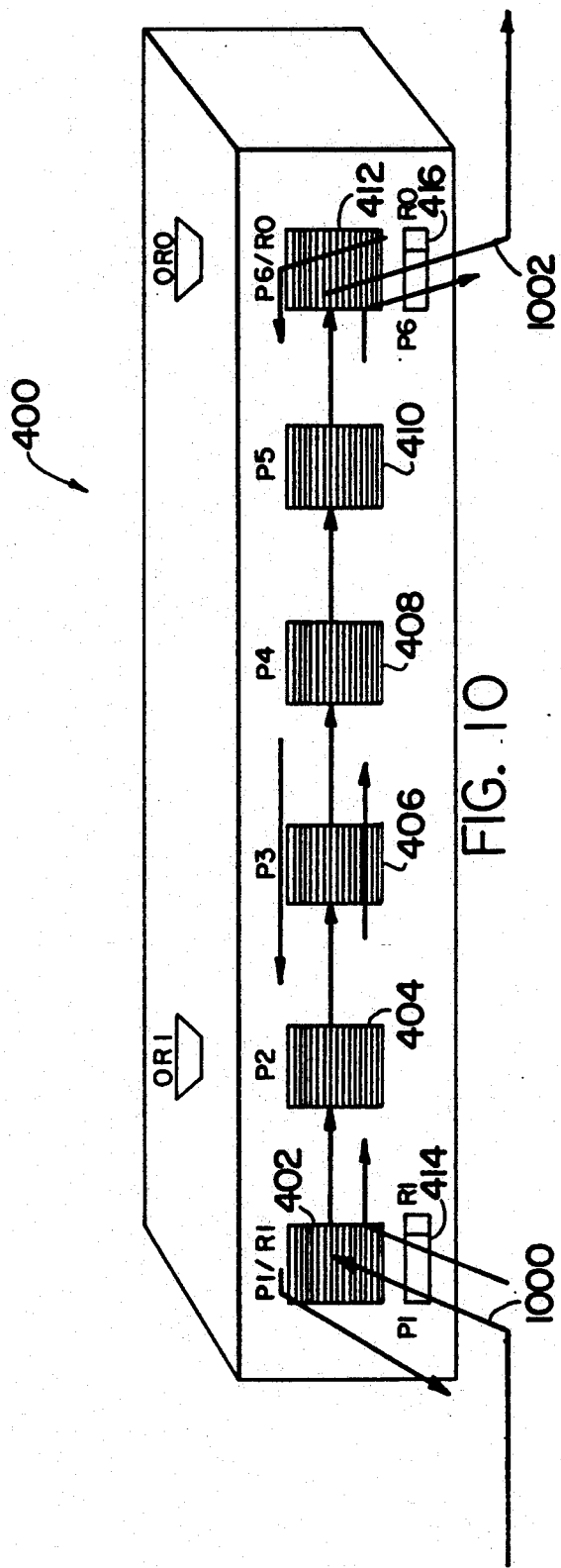
FIG. 10 illustrates the base unit of FIG. 4 with no optic elements attached and switched to a ring-in/ring-out configuration for connection to a physical LAN.

FIG. 10 illustrates a configuration called copper-in, copper-out, wherein no optic elements are present, and while not a likely configuration, it is a valid one. It is assumed that a copper cable 1000 is connected to the data connector 402 as well as a copper cable 1002 connected to the data connector 412. Both data connectors 402,412 are in the ring-in, ring-out positions respectively, i.e. both data connectors are configured for network expansion as opposed to workstation connection. The data path from other Multiple Access Units (MAU's) enters from upstream on cable 1000 into the data connector 402, through ports p2 through p5 (data connectors 404, 406, 408, 410) and then back to data connector 412 where the data is routed directly out onto the copper cable 1002. Data returning from the copper cable 1002 on the alternate or backup channel comes into data connector 412 and is routed directly and immediately to the data connector 402 where it is routed back to the copper cable 1000 that goes upstream.

Figure 11:
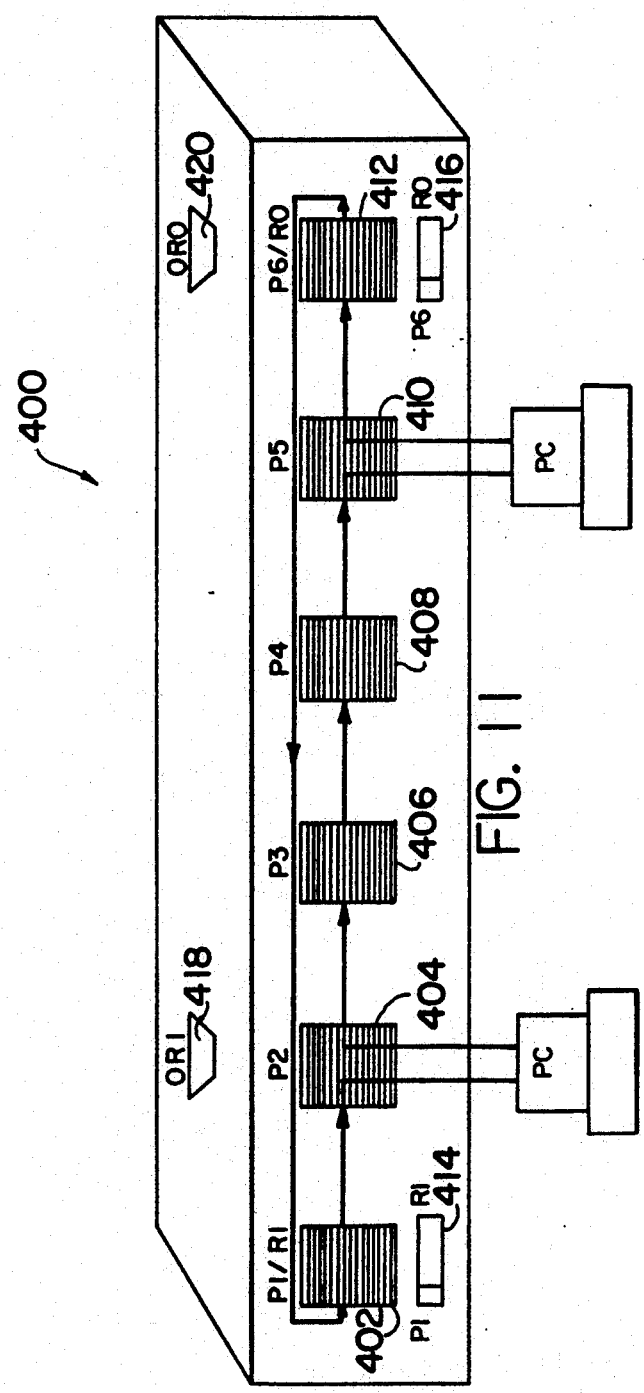
FIG. 11 illustrates the base unit of FIG. 4 with no optic elements attached and switched to a stand alone ring configuration.

FIG. 11 illustrates the base unit 400 configured as a stand alone ring architecture. The base unit 400 is configured as a port at the data connector 402 and the data connector 412. There are no optic elements connected to the ORI and ORO connectors 418,420, respectively. In this configuration, the data flow is from data connector 402 through ports 2 through 5 to data connector 412 on the main ring. The data is then wrapped or folded back around on the backup ring directly back to data connector 402 to provide a closed ring within the base unit, i.e. a stand alone ring.

Turning now to FIGS. 12-27, the internal data path selection that occurs in the base unit described generally above in FIGS. 4-11, is illustrated in schematic functional block diagram form. The internal configuration illustrated in FIG. 12 corresponds generally to FIG. 4. An ORI connector designated 1200 is coupled to a logic block control A 1204, a logic block data wrap MUX A 1206, and logic block path select MUX A 1208. The data wrap MUX A 1206 is used to determine whether the data has gone out over the optical ring-in path or whether the data is wrapped internally within the base unit. The path select MUX A 1208, along with path select MUX B 1210, MUX C 1214 and MUX D 1216 are used to configure the data flow within the base unit. The path select MUX A 1208 is used to select the data which goes out through the ORI connector 1200, coming from either the ring-out port 6 data connector 1218 or from the ORO connector 1202 through its data wrap MUX B 1220. The path select MUX C is used to select data from the data wrap MUX A 1206 from the ORI connector 1200 or the ORO connector 1202 through its data wrap MUX B 1220. The data path select MUX D 1216 selects data from port 1/ring-in data connector 1222 or the data wrap MUX A from the ORI connector 1200. The path select MUX's are chosen through a logic circuit block (not shown) which controls all four MUX's and the logic circuit block configuration is based on whether the base unit switches are operated to the port configuration or ring-in configuration as well as whether there are upstream and downstream optic elements connected to the ORI connector 1200 and the ORO connector 1202, respectively. The control logic also has a capability to detect whether there is presence of an optic element through the optical ring-in and ring-out connectors.

Data in on channel A is shown as a dashed line and is the main data channel. Data comes in through the ORI connector 1200, through the data wrap MUX A 1206, to the path select MUX C 1214, to the port 1 data connector 1222 configured as a port and to a pc workstation if it is present. If the pc workstation is not present, the data wraps within the data connector 1222 back to the path select MUX D 1216 where it is routed through ports 2 through 4 and directly to port 6 data connector 1218. The data is routed back through path select MUX B 1210 and out the ORO connector 1202. The second channel, channel B shown as a dotted line comes in the ORO connector 1202, passes through the data wrap MUX B 1220, directly to the path select MUX A 1202 and then out through the ORI connector 1200. The data wrap MUX B 1220 is used to wrap data if there has been a break in the ORI upstream data path, that is, the backup ring is used to complete the connection. Data wrap MUX B 1220 performs the same function only for the downstream optical path. If a LOSS in communication either over the ORI 1200 or the ORO 1202 is sensed, a control indicator, not shown, indicates that there is a fault in either the upstream or the downstream depending on where the fault occurs. The control logic associated with the base unit determines general fault conditions based on the presence of the optic elements at the ORI connector or the ORO connector as well as the presence of data or internally generated "keep alive" signals which are described in further detail later in this disclosure.

Figure 13:
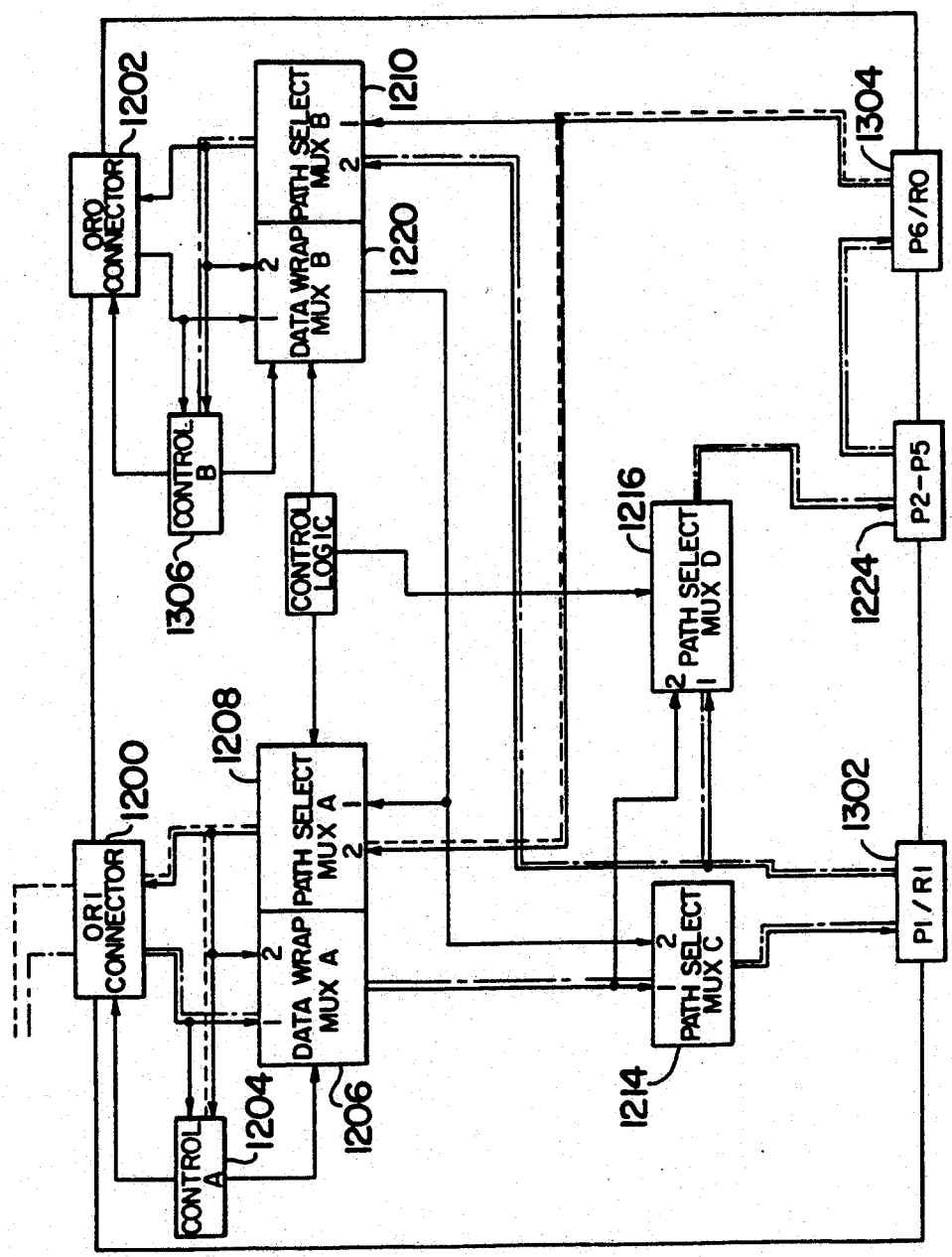
FIG. 13 is a schematic functional block diagram illustrating the selected data paths through a base unit with only an upstream optic element attached and switched to a port configuration.

Turning to FIG. 13 which corresponds generally to the system illustrated in FIG. 7, which shows the presence of a single optic element, specifically the upstream optic element connected to the ORI connector 1200, and the end two data connectors 1302,1304 respectively wherein data connectors 1302 and 1304 are configured for a workstation connection. The data path of channel A shown as a dashed line enters from the optical domain into the ORI connector 1200, is switched by data wrap MUX A 1208 into the path select MUX C 1214 and directly into the data connector 1302. Data returning from the data connector 1302 is routed to path select MUX D 1216 as well as path select MUX B 1220 for use in controlling the signal path in the event of faults. Data through the path select MUX D 1216 is routed into the workstation ports p2 through p5 collectively 1224 and then directly into data connector 1304 where the data is then routed as channel B shown as a dotted line in the case of a wrap at data connector 1304 into path select MUX A 1208 through the ORI connector 1200 and out to the optical domain.

Figure 12:
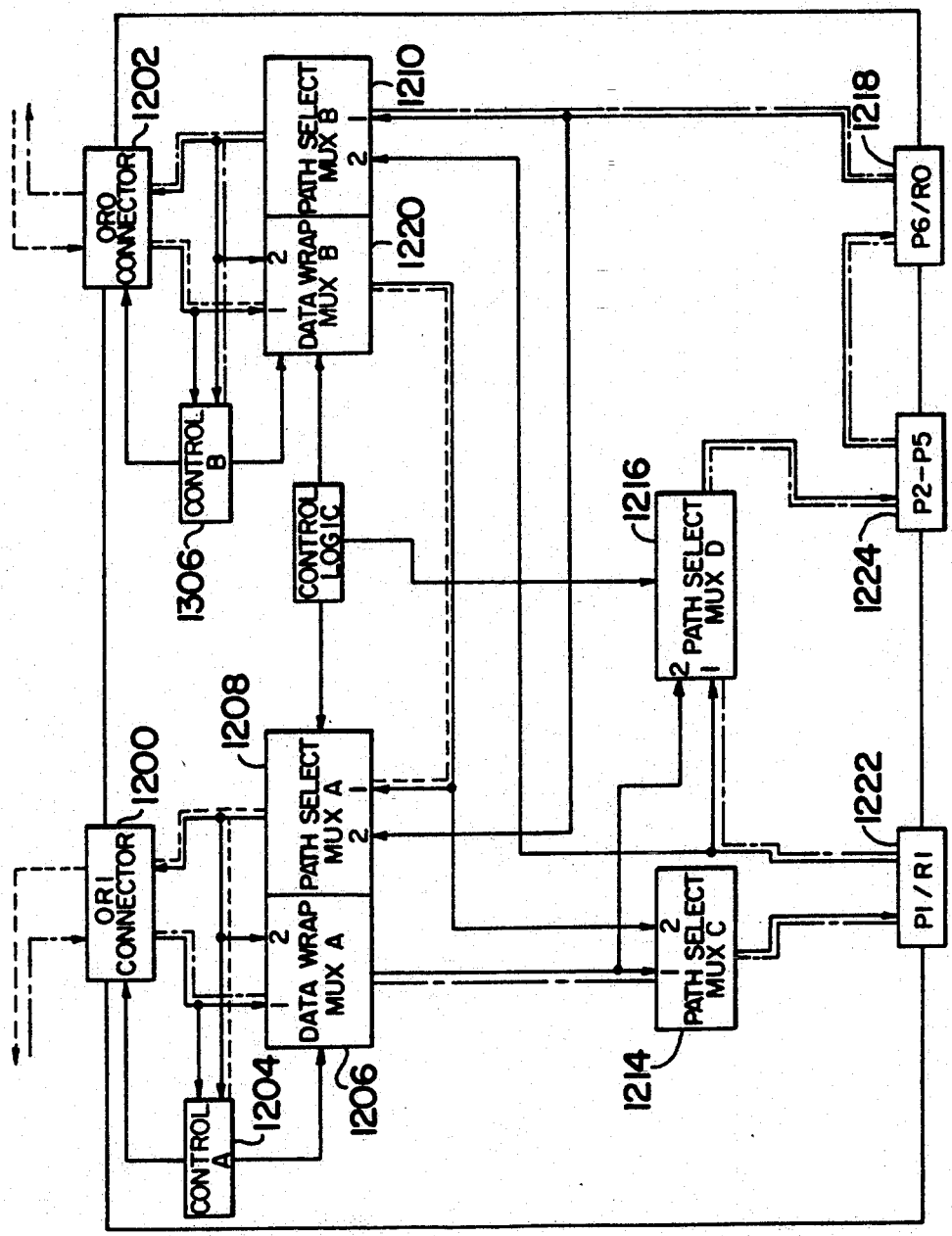
FIG. 12 is a schematic functional block diagram illustrating the selected data paths through a base unit with an upstream and downstream optic element attached and switched to a port configuration.

Considering the differences between FIGS. 12 and 13, these differences represent novel features of the invention. The internal control logic is responsible for making the decisions as to where the data actually is routed within the base unit. FIG. 12 shows two optic elements upstream ORI and downstream ORO and FIG. 13 shows a single optic element configuration, that is the upstream optic element ORI. In FIG. 12, the channel A data path has a specific routing from the optical domain through the ports and back to the optical domain with a similar path existing for channel B from the ORO connector in through the base unit to the ORI connector. The configuration change shown in FIG. 13 compared to FIG. 12 shows the downstream optic element removed. The control logic in the base unit changes the basic internal configuration in the normal mode of operation such that the channel A data is routed in a similar fashion from the ORI connector into the workstation, into the ports and the data connector ports. At the port 6 data connector 1304, the difference is apparent wherein the data path is then selected by path select MUX A 1208 to return to the ORI connector 1200. In FIG. 13, the ORO connector is not used because the downstream optic element in the downstream path direction has been disconnected. In FIG. 13, the data path, labelled data path A1, is not actually a path that the data would take but rather the data that is on that path appears at the path select MUX B 1210 and at control B 1306 simply as a detection system to detect whether data activity on the main path is token ring data. The data type on data path A1 is used in the decisions made for the internal configurations in the case of a fault. In FIGS. 12 and 13, the control block A 1204 is used to detect the data signal that is present on the data path for purposes of fault control and reconfiguration under various fault conditions. The control block B 1306 is used exclusively in the case of FIG. 13 as a control input. In FIG. 12, the data represents a control input to control block B 1306 as well as the data output to the ORO connector 1202 when the downstream optic element is present. These control inputs to control block A and control block B are used for the purposes of reconfiguration of the base unit during the occurrence of a fault.

Figure 14:
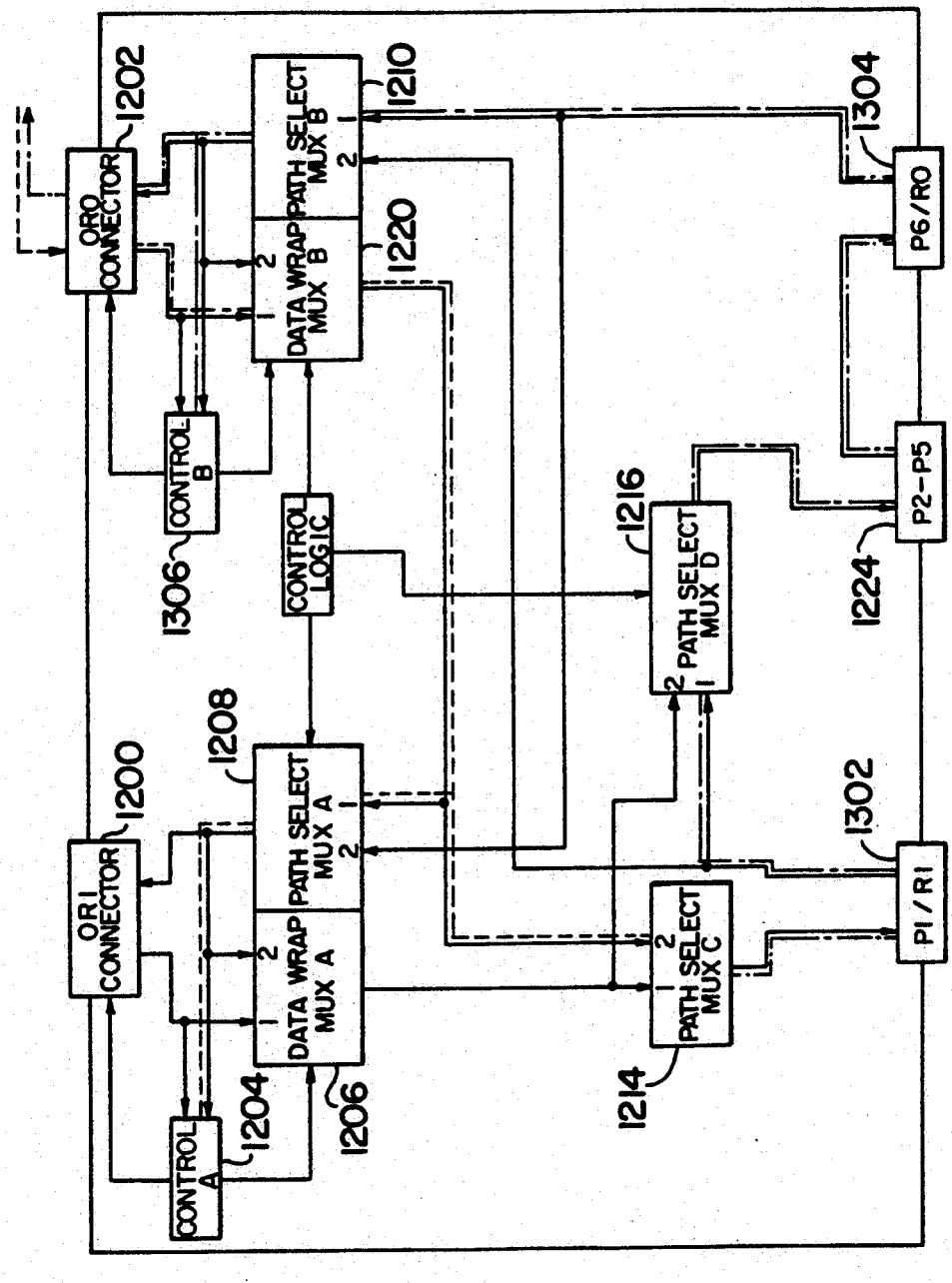
FIG. 14 is a schematic functional block diagram illustrating the selected data paths through a base unit with only a downstream optic element attached and switched to a port configuration.

FIG. 14 corresponds generally to the system illustrated in FIG. 9. This is a straight forward case showing only the downstream optic element present and is very similar to the previous discussions of FIG. 13 where the upstream optic element is present. In FIG. 14, only the downstream optical node is present and is connected through the ORO connector 1202. Control block A 1204 and control block B 1306 both have inputs 1402, 1404, respectively from the data path for signal detection to allow the control logic to reconfigure the base unit in the case of a fault. The data paths in FIG. 14 are straight forward and should be understood based on the explanations above with channel A shown as a dashed line and channel B shown as a dotted line.

Figure 15:
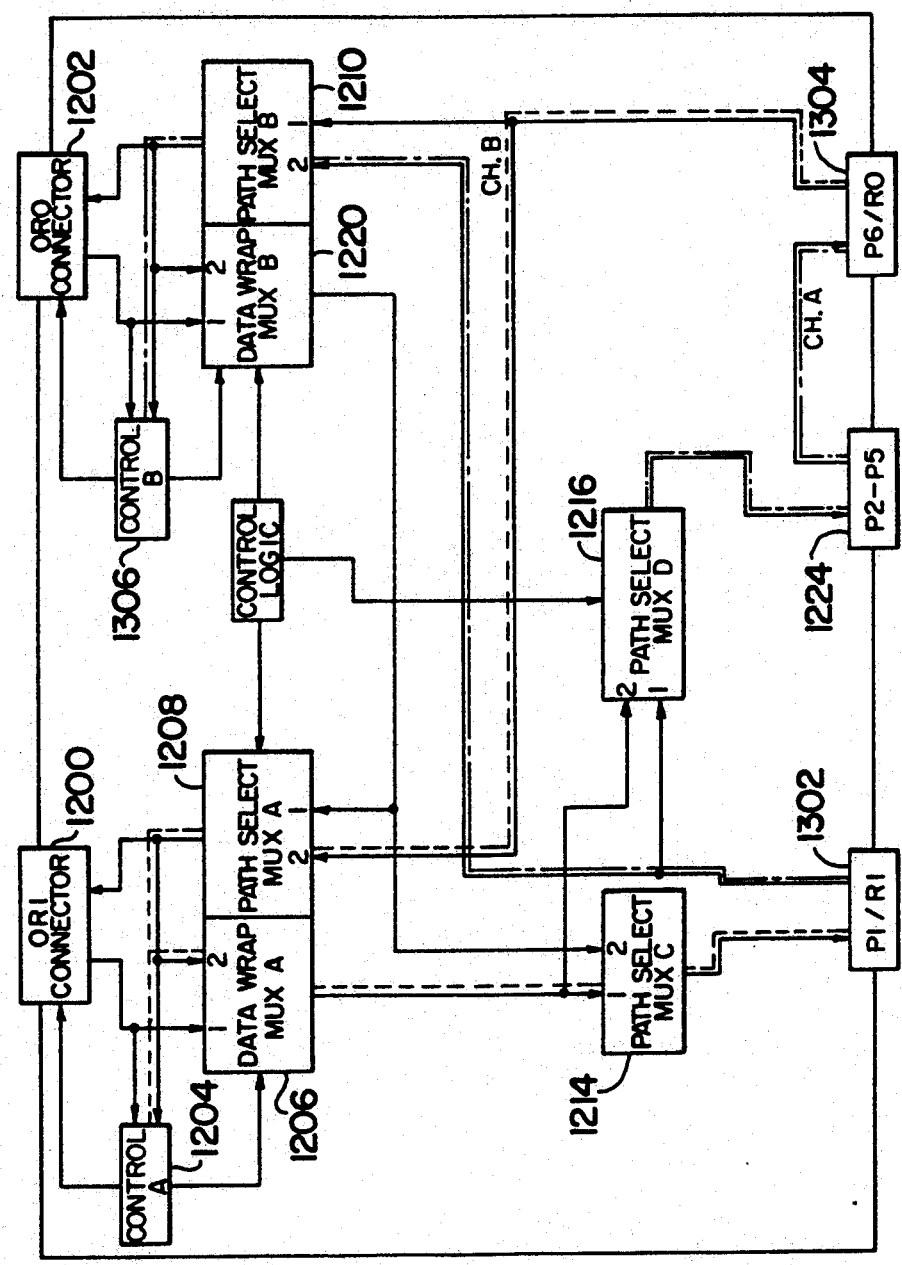
FIG. 15 is a schematic block diagram illustrating the selected data path through a base unit with no optic elements attached and switched to a port configuration.

FIG. 15 corresponds generally to the system illustrated in FIG. 11 which illustrates a stand alone ring and no optic elements attached. The internal data paths have been reconfigured under the normal operating scenario in recognition that no optic elements are connected to the base unit. The data path is straight forward with channel A represented as the dashed line and channel B as the dotted line. Without the optic elements, this configuration has no particular significance since the data path is the same data. In FIG. 15 it is seen that the data wrap MUX A 1206 and path select MUX A 1208 are used to create the stand alone ring within the base unit. The channel B data path shown by the dotted line, enters the path select MUX A 1208 from the bottom and wraps directly around into input 2 of data wrap MUX A 1206 and back out to achieve the wrap and provide the closed ring configuration when no optic are present. The control logic associated with control block A 1204 and control block B 1306 makes the path selection decisions and corresponding internal configuration changes.

Figure 16:
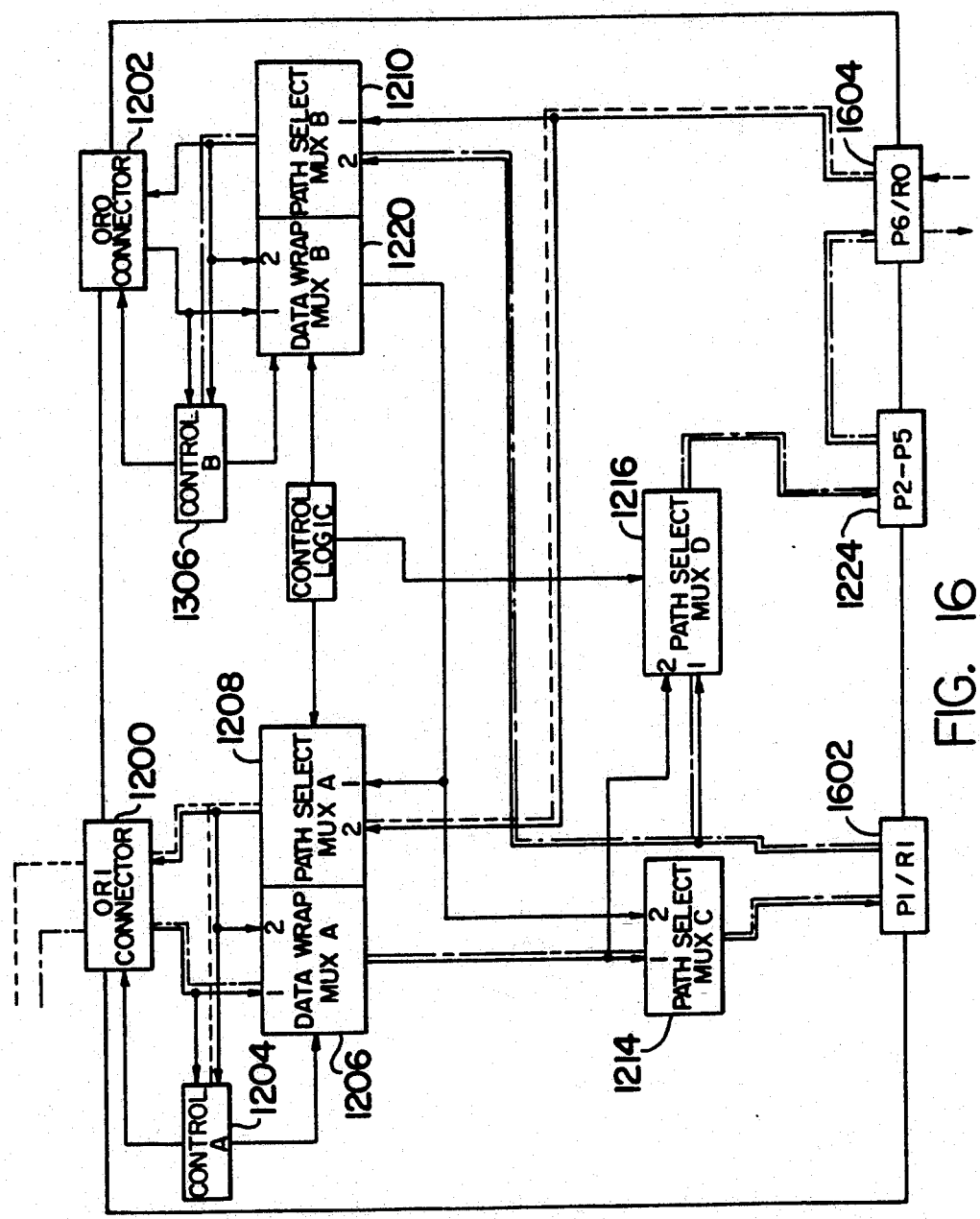
FIG. 16 is a functional block diagram illustrating the selected data paths through a base unit incorrectly installed with both upstream and downstream optic elements attached and switched to a ring-out configuration.

Referring now to FIG. 16, which generally corresponds to the system illustrated in FIG. 6, one typical installation error is illustrated and operation of the base unit is explained as follows. The port 1/ring-in switch is operated to configure the data connector 1602 as a port for connection to a workstation. The port 6/ring-out switch is operated to configure the data connector 1604 as a ring-out data connector. Since the base unit is configured so that one end is a workstation data connector and the other end is a ring-out data connector, it is a required condition for operation that some other type of ring-in be present. In order to have the ring-in present and meet the required condition, the ring-in must be an optical ring-in. Because the ring-out at data connector 1604 is on copper, there cannot be an optical ring-out element or ORO connection used. If such a connection is made, an installation error condition occurs and the error is diagnostically shown or indicated through the flashing of a light emitting diode (LED) or other such indicator to signify a downstream wrap. The indicator is located to be visible on the base unit to alert the operator of the installation error. The data path internally also routes around the connection such that a connection, if there is one, and data coming in, if there is any, cannot hinder or effect the internal operation of the base unit. The only valid configuration for the optic elements in FIG. 16 is where upstream optic element is connected to the ORI connector 1200. It is an invalid condition for the operator to attempt to connect an optic element to the ORO connector 1202.

Figure 17:
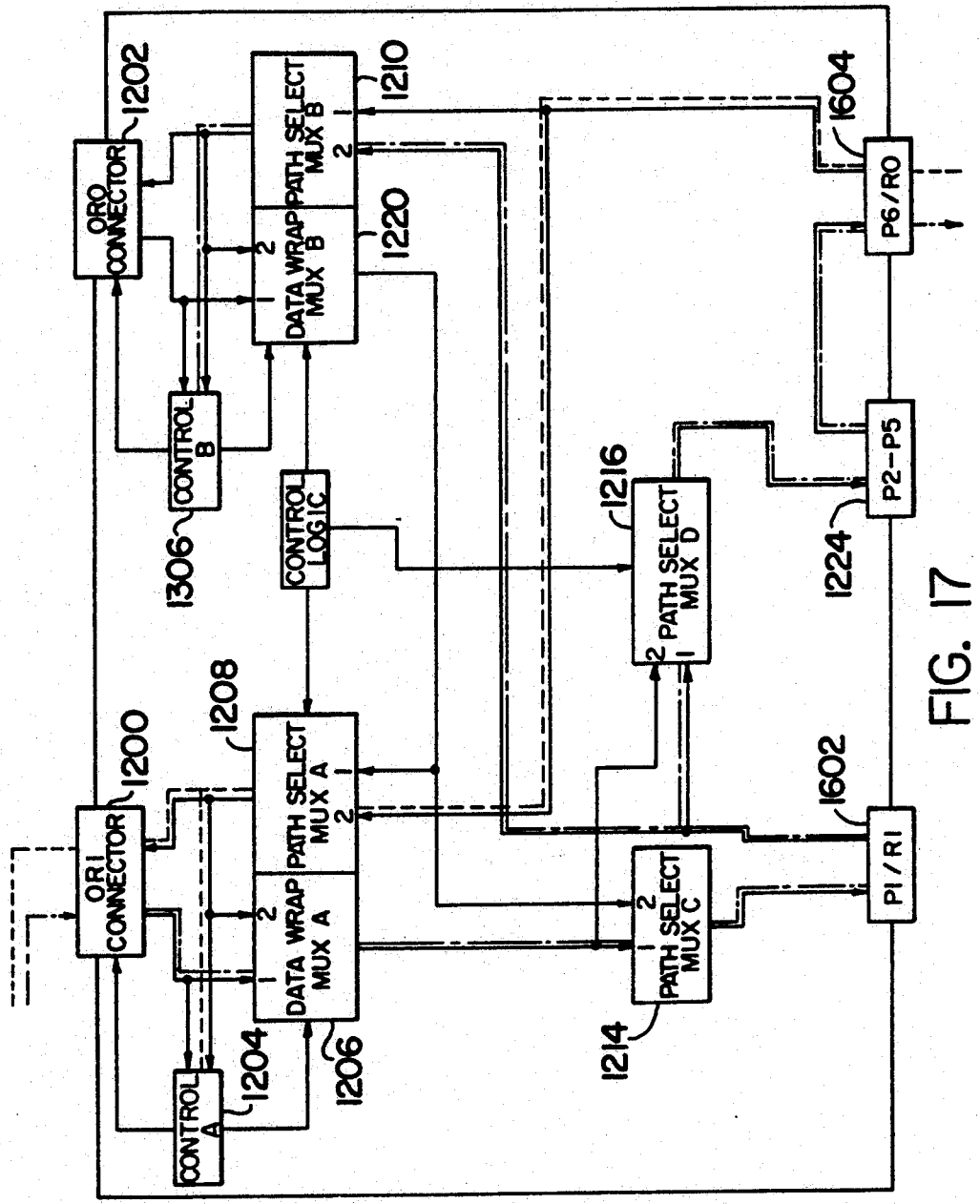
FIG. 17 is a functional block diagram illustrating the selected data paths through a base unit having an upstream optic element attached and switched to a ring-out configuration.

In comparison to FIG. 16, FIG. 17 which generally corresponds to the system illustrated in FIG. 6, FIG. 17 illustrates a valid operational condition. The p1/RI data connector 1602 and the p6/RO data connector 1604 are configured respectively for a port or workstation connection and a ring-out connection. If in FIG. 16, the ORO optic element on the downstream side is removed from the ORO connector, the configuration in FIG. 17 is replicated which is the normal operating configuration for this switch configuration, i.e. the port 1 switch is selected and the ring-out switch is selected.

Figure 18:
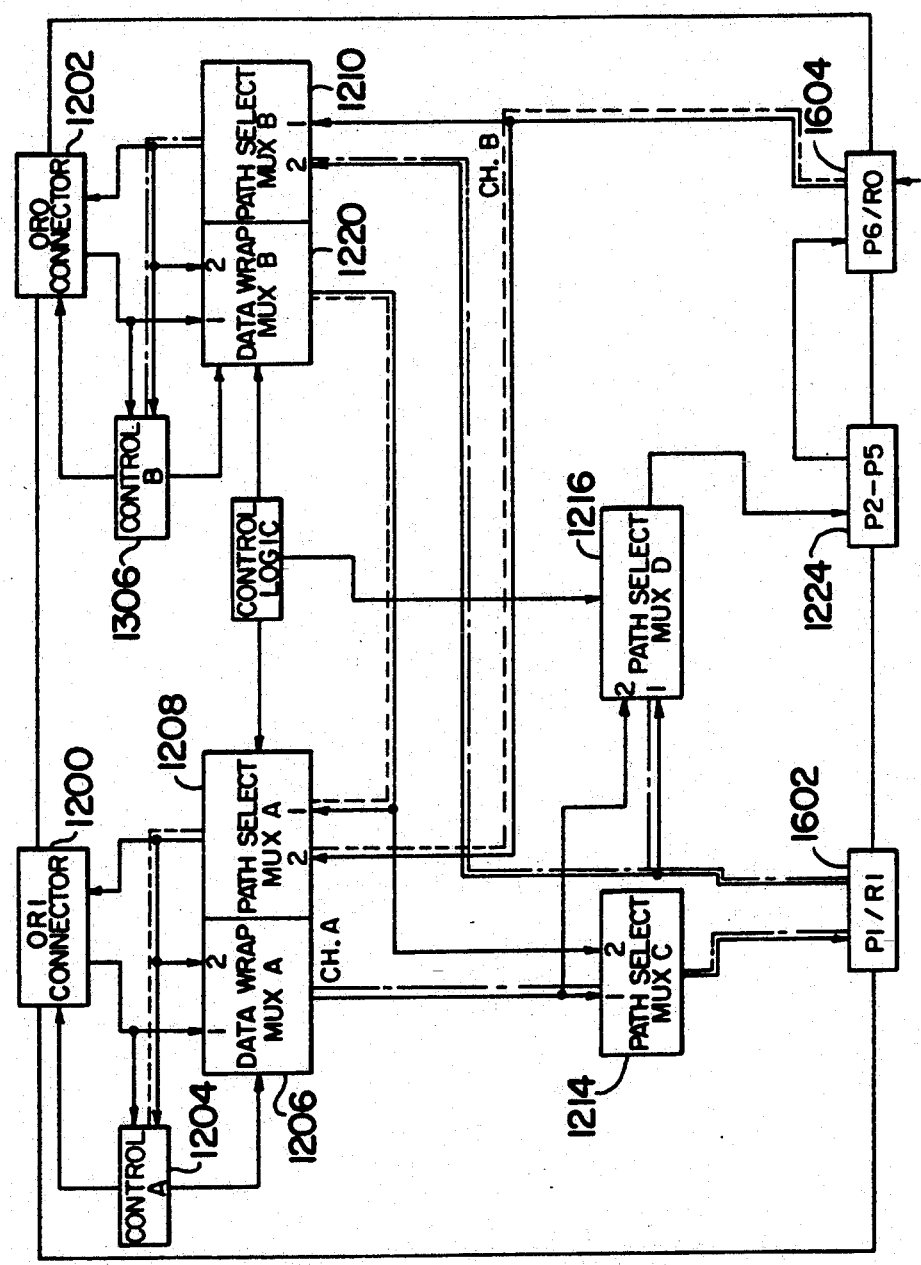
FIG. 18 is a functional block diagram illustrating the selected data paths through a base unit incorrectly installed with a downstream optic element attached and switched to a ring-out configuration.

Referring to FIG. 18, another invalid configuration is illustrated wherein the ORO optic element is present and connected to connector 1202 and the switches are set so that the p1/RI data connector 1602 is configured for a workstation attachment and the p6/RO data connector 1604 is configured for ring-out configuration. The switch settings cause the base unit logic to expect the operator to attach the upstream optic element as illustrated in FIG. 16. In FIG. 18, the downstream optic element is attached to the ORO connector 1202. The invalid configuration is indicated to the operator by an alternate flashing of the upstream wrap LED and the downstream wrap LED both of which are located to be visible on the base unit. The alternate flashing of the upstream and downstream wrap LED's is an indication that the operator has installed the optic element into the wrong connector, here the ORO connector 1202. The configuration could be corrected if the optic element were removed from the ORO connector 1202 and plugged into the ORI connector 1200 causing it to be the correct configuration.

Figure 19:
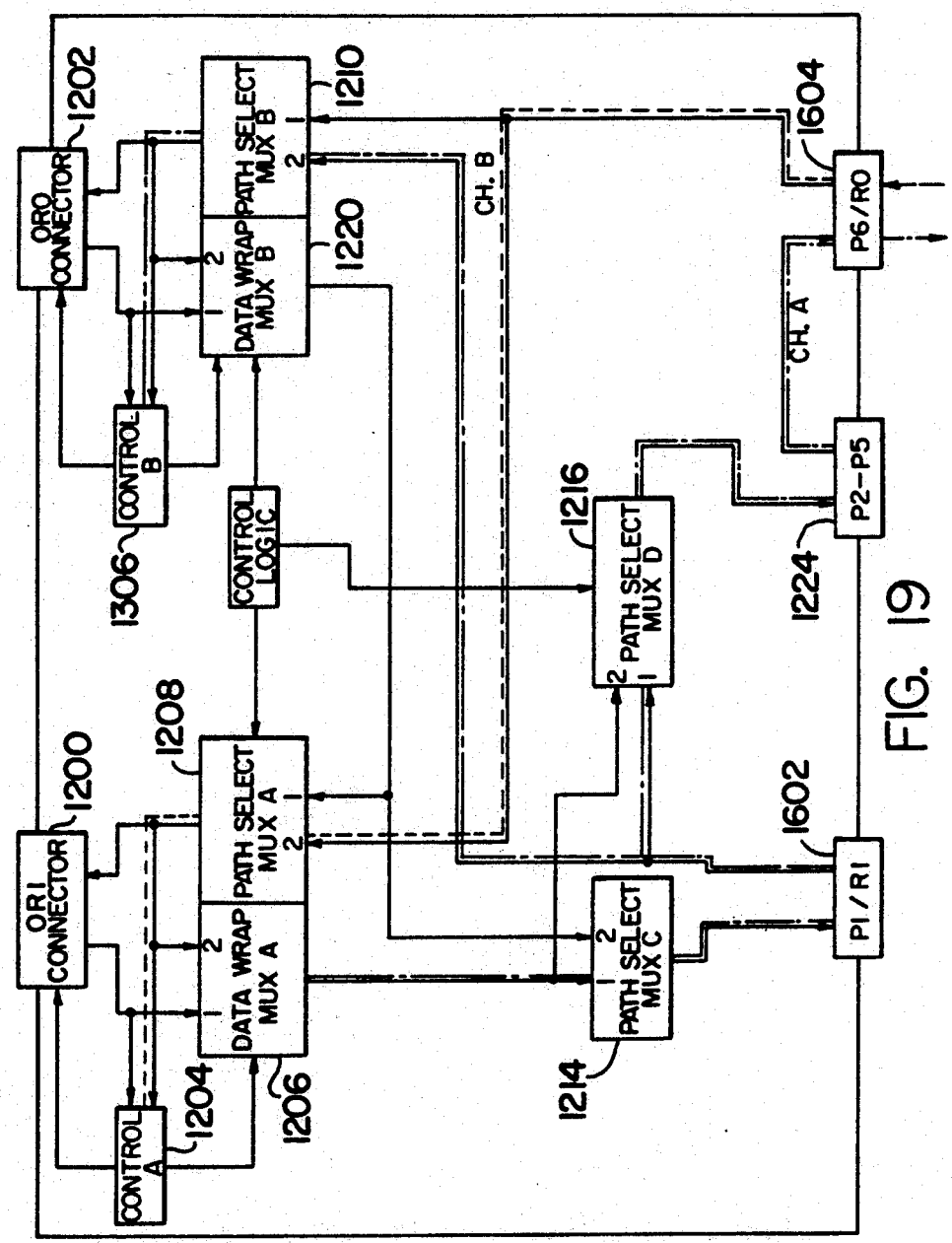
FIG. 19 is a functional block diagram illustrating the selected data paths through a base unit incorrectly installed with no optic elements attached and switched to a ring-out configuration.

FIG. 19 illustrates another installation error condition. FIG. 19 generally corresponds to the system illustrated in FIG. 6 wherein an upstream optic element is attached to the ORI connector 1200 and the switches set the p1/RI data connector to the workstation configuration and the p6/RO data connector to the ring-out configuration. In FIG. 19, the ORI connector 1200 and the ORO 1202 connector do not have optic elements attached. The configuration of the base unit with the switches set as defined expect the operator to have connected the upstream optic element to the ORI connector 1200. This installation error is detected by the control logic in the base unit and the error is indicated too the operator by flashing the upstream wrap LED located on the base unit. The flashing alarm alerts the operator that an upstream optic element attachment is required in order to make the switch setting a valid operational configuration.

Figure 20:
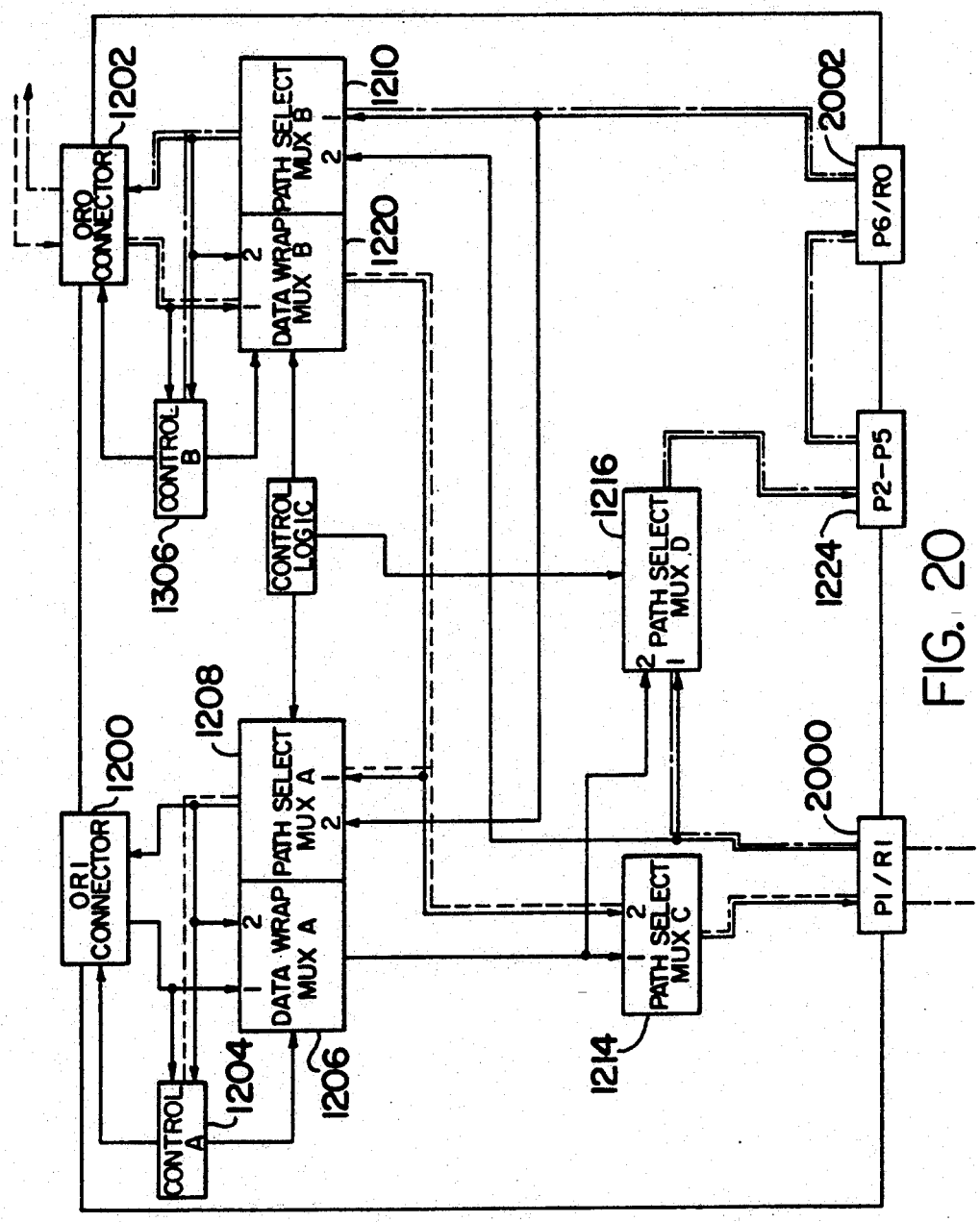
FIG. 20 is a functional block diagram illustrating the selected data paths through a base unit incorrectly installed with upstream and downstream optic elements attached and switched to a ring-in configuration.

FIG. 20 illustrates another invalid installation condition and corresponds generally to the system configuration illustrated in FIG. 8 wherein the downstream optic element connection is required and the switch settings to configure the p1/RI data connector 2000 for ring-in operation and to configure the p6/RO data connector 2002 for workstation attachment. FIG. 20 illustrates the condition where both the upstream optic element and the downstream optic element are attached to the respective ORI connector 1200 and ORO connector 1202. The switches set as defined in FIG. 20 produces an installation error and the control logic within the base unit detects this error and alerts the operator to the error by flashing the upstream wrap LED. The detection mechanism which allows the control logic within the base unit to detect whether the optic element is in fact connected to its respective connector is accomplished by an electronic signal originating from the ORI/ORO connector.

Figure 21:
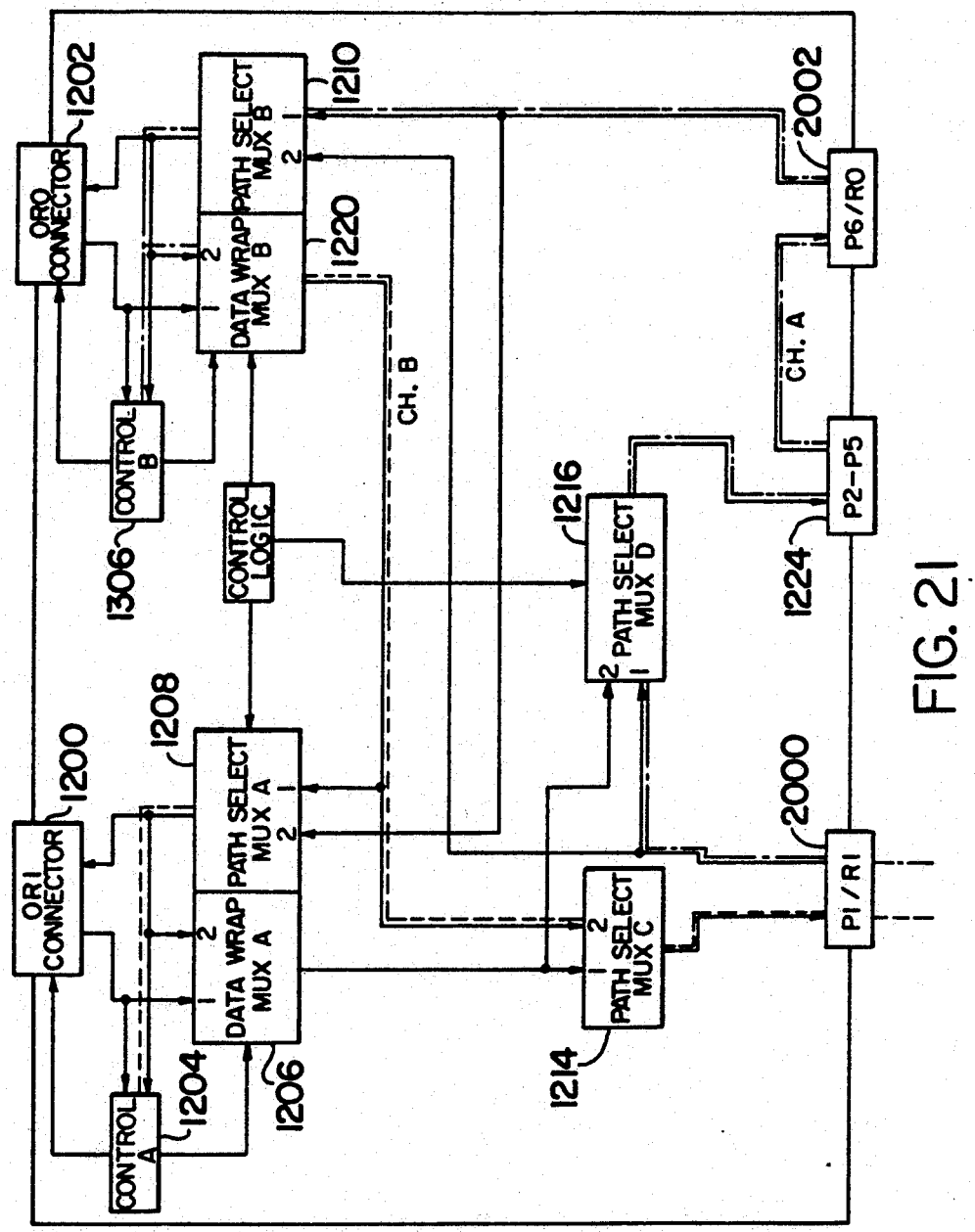
FIG. 21 is a functional block diagram illustrating the selected data paths through a base unit incorrectly installed with an upstream optic element attached and switched to a ring-in configuration.
Figure 22:
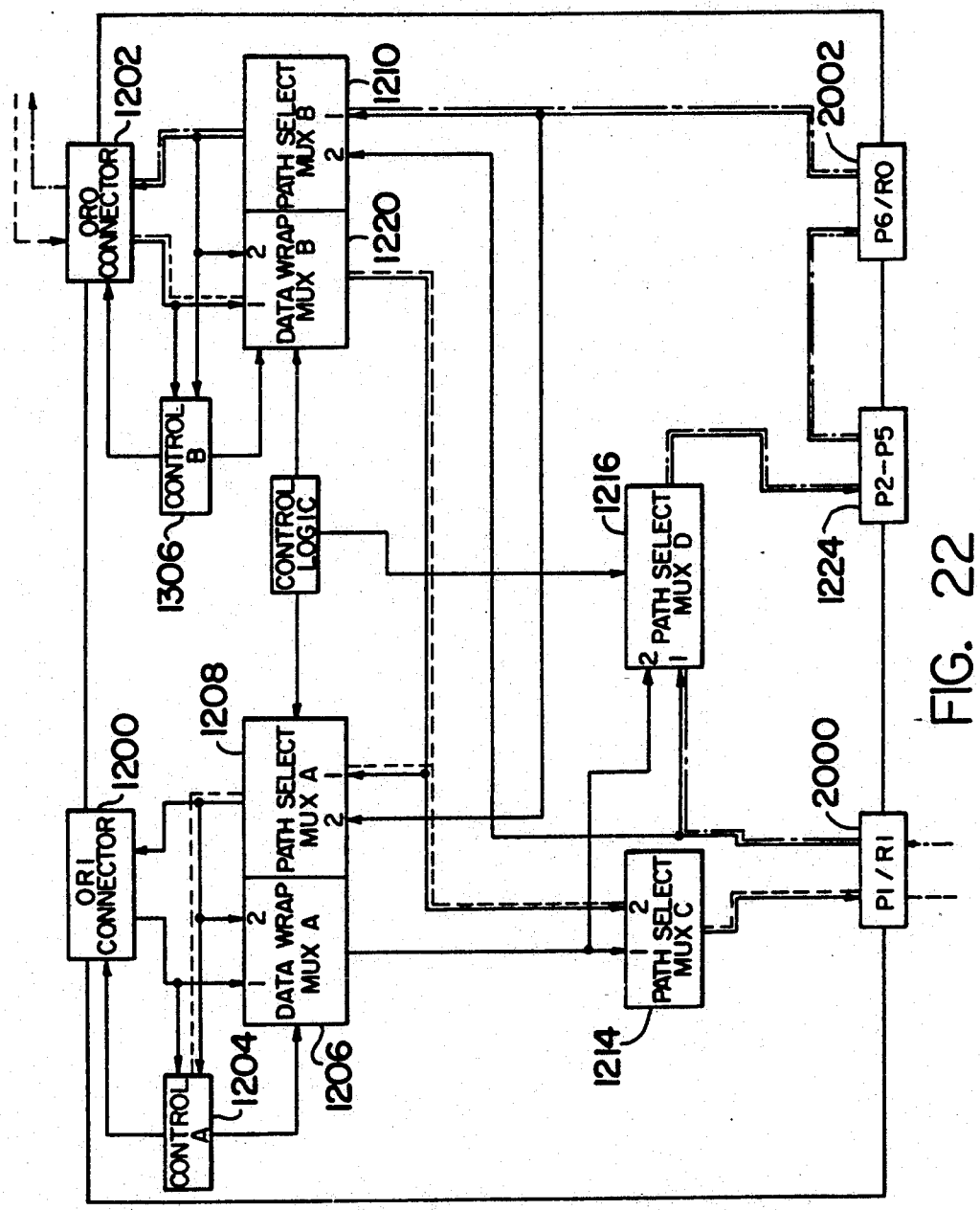
FIG. 22 is a functional block diagram illustrating the selected data paths through a base unit correctly installed with a downstream optic element attached and switched to a ring-in configuration.

Referring to FIG. 21, another installation error condition is illustrated. The switches are set to configure the port 1/ring-in data connector 2000 for ring-in operation and to configure the port 6/ring-out data connector 2002 for port or workstation connection. The ORI connector 1200 has an upstream optic element connected but the ORO connector 1202 does not have an optic element attached. This is an invalid installation configuration because the switches as set expect an optic element to be connected to the ORO connector 1202. This configuration error is indicated by the upstream wrap LED and the downstream wrap LED flashing in an alternate fashion to alert the user to switch the optic element connection from the ORI connector 1200 to the ORO connector 1202. FIG. 22 illustrates the normal configuration for the switch configuration shown in FIG. 21 and wherein the optic element is connected to the ORO connector 1202 as required.

Figure 23:
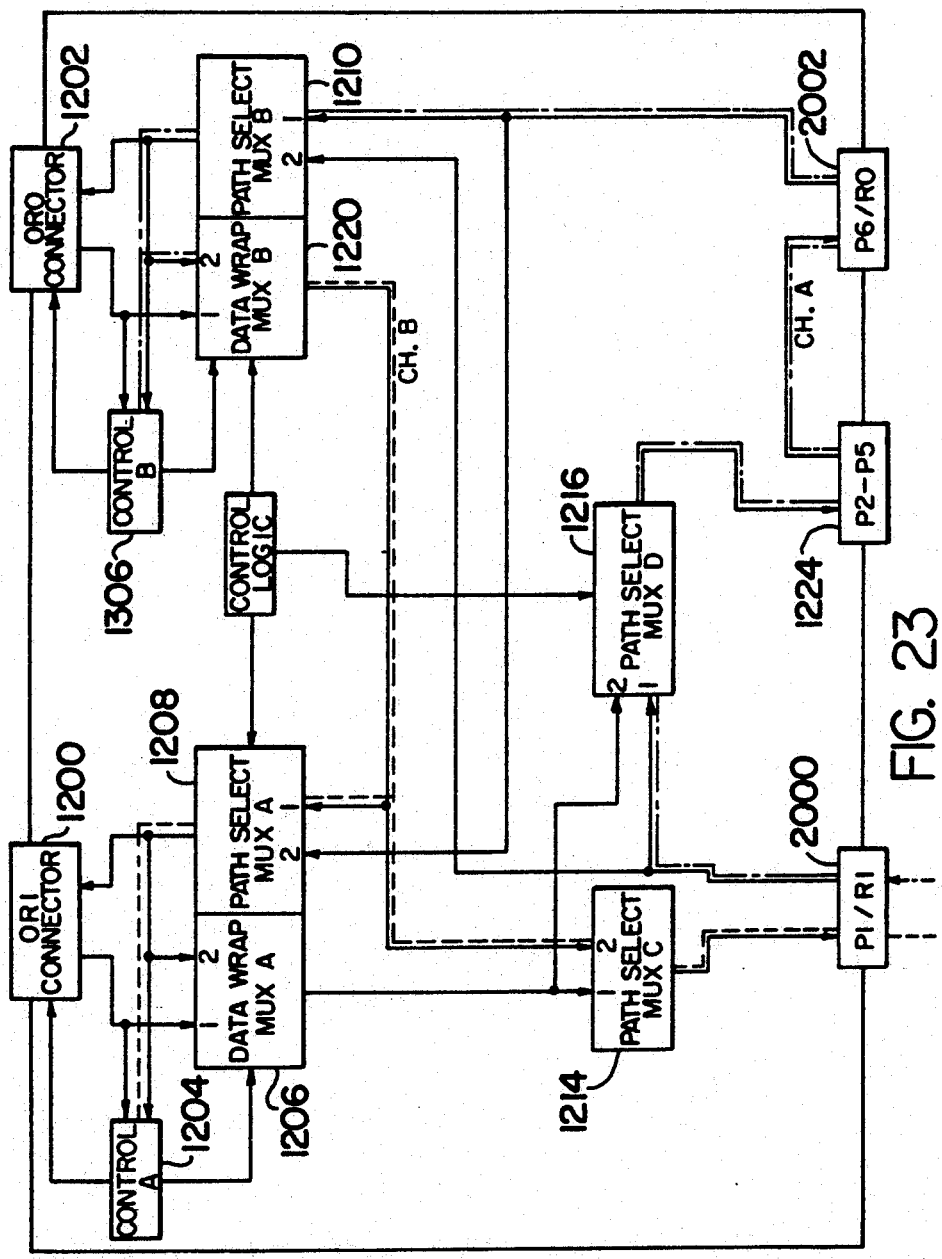
FIG. 23 is a functional block diagram illustrating the selected data paths through a base unit incorrectly installed without optic elements attached and switched to a ring-in configuration.
Figure 24:
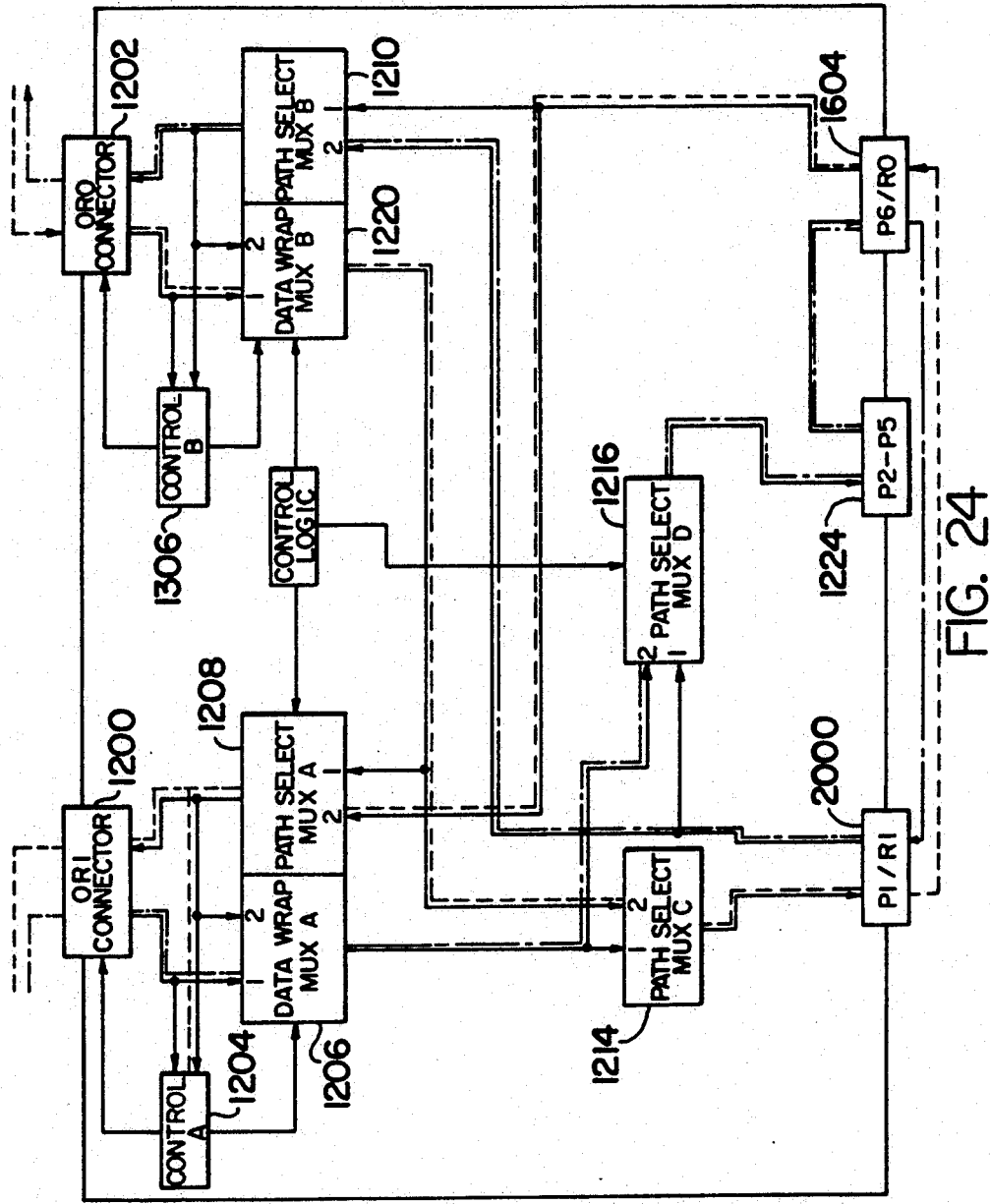
FIG. 24 is a functional block diagram illustrating the selected data paths through a base unit correctly installed with upstream and downstream optic elements attached and switched to a ring-in/ring-out configuration.

FIG. 23 illustrates a further installation error condition. The switches are set to configure the port 1/RI data connector 2000 for ring-in and to configure the port 6/RO data connector 2002 for port or workstation attachment. Optic elements are not connected to either the ORI connector 1200 or the ORO connector 1202. This is an invalid configuration since the switch settings define that the downstream optic element is expected to be connected to the ORO connector 1202. This installation error is detected by the logic in the base unit and is indicated by flashing the downstream wrap LED. FIG. 24 illustrates the normal configuration which requires both optic elements be connected as well as the switches being operated to provide ring-in and ring-out at the data connectors 2000 and 1604 respectively.

Figure 25:
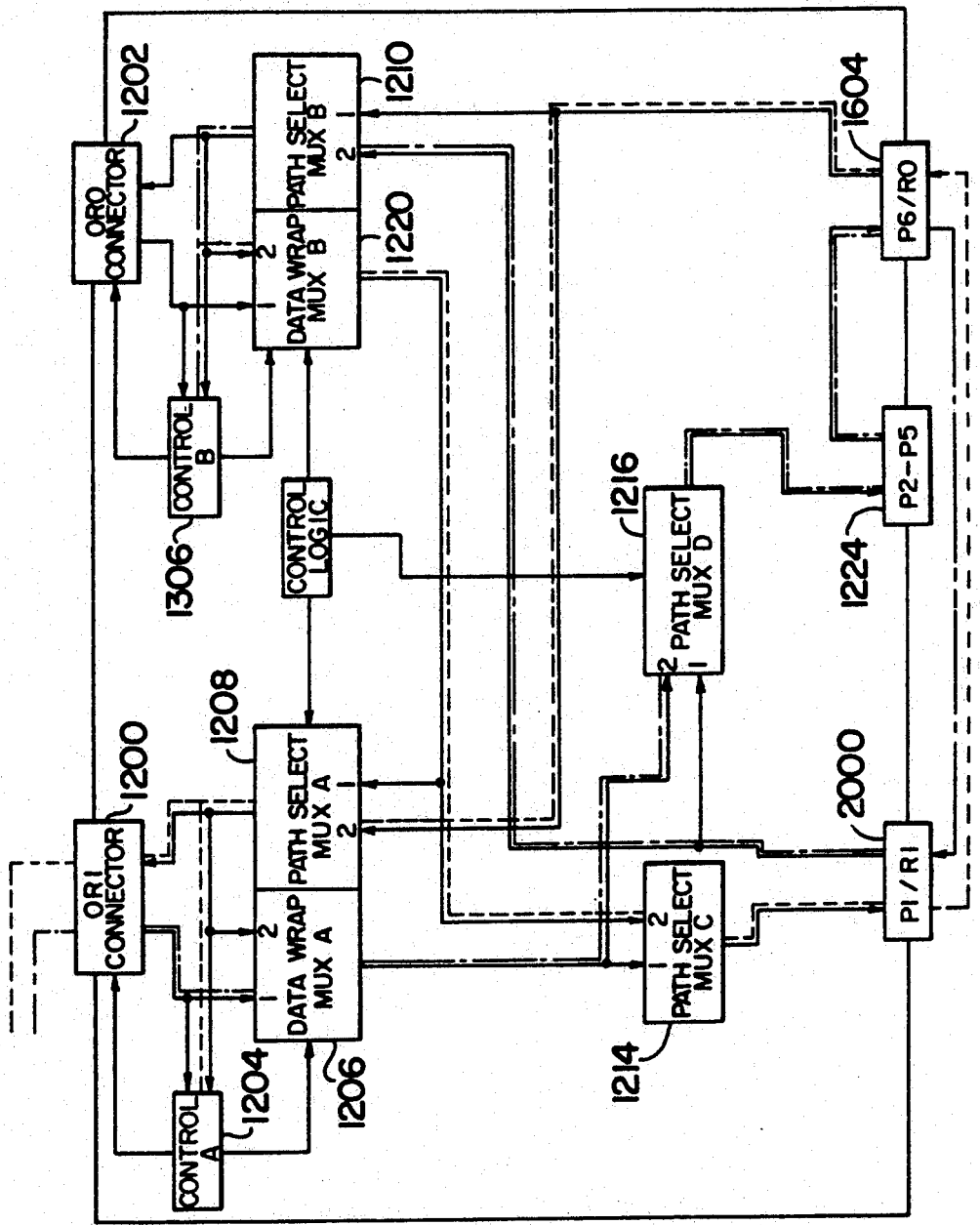
FIG. 25 is a functional block diagram illustrating the selected data paths through a base unit incorrectly installed with an upstream optic element attached and switched to a ring-in/ring-out configuration.

FIG. 25 illustrates another installation error condition. The switches are set to configure the data connectors 2000 and 1604 for ring-in and ring-out operation, respectively. The upstream optic element is connected in FIG. 25 but there is no optic element connected to the ORO connector 1202. This is an installation error. The configuration requires both optic elements be present and this error condition is indicated to the operator by simultaneous flashing of the upstream wrap LED and the downstream wrap LED prompting the operator to connect the second optic element to correct the error configuration.

Figure 26:
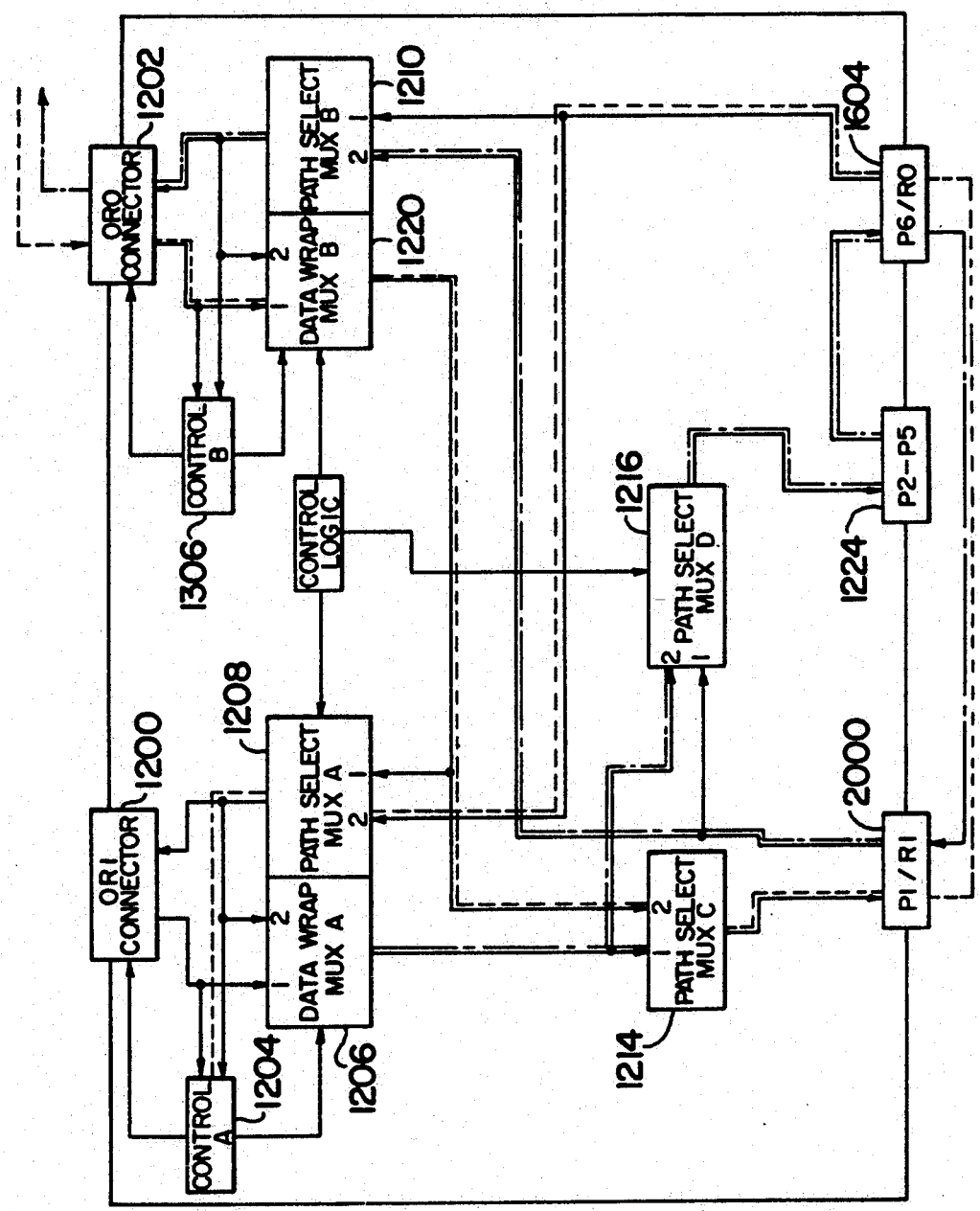
FIG. 26 is a functional block diagram illustrating the selected data paths through a base unit incorrectly installed with a downstream optic element attached and switched to a ring-in/ring-out configuration.

FIG. 26 illustrates an installation error condition similar to the one illustrated in FIG. 25. Both optic elements are required to be present when the switches are set as shown FIG. 26, that is, both switches are set to configure the data connectors 2000 and 1604 for ring-in and ring-out operation, respectively. In FIG. 26, it is assumed the upstream optic element is missing but the downstream optic element is attached to the ORO connector 1202. This is an installation error and the error is indicated to the user by simultaneously flashing the upstream wrap LED and the downstream wrap LED.

Figure 27:
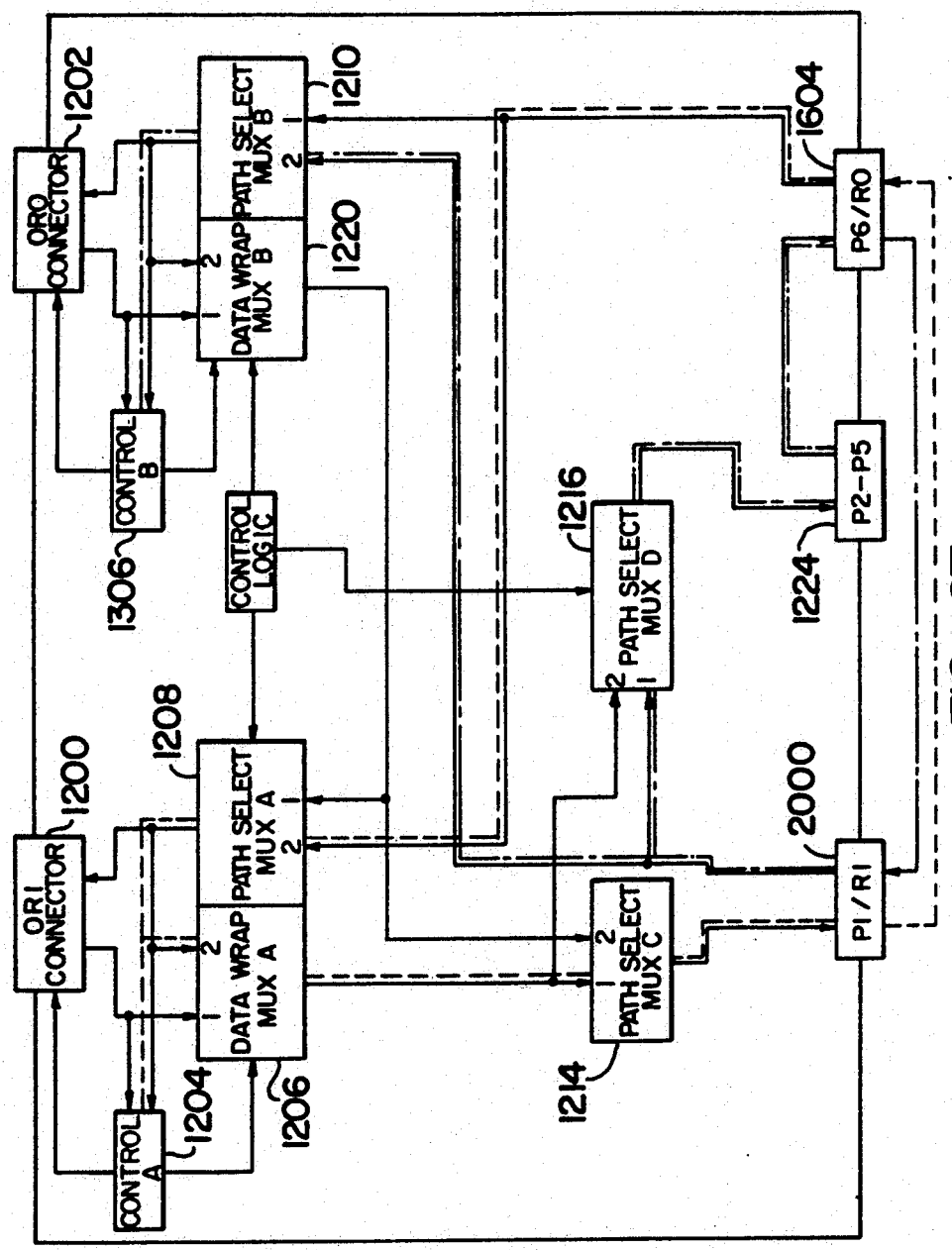
FIG. 27 is a functional block diagram illustrating the selected data paths through a base unit correctly installed without optic elements attached and switched to a ring-in/ring-out configuration.
Figure 28:
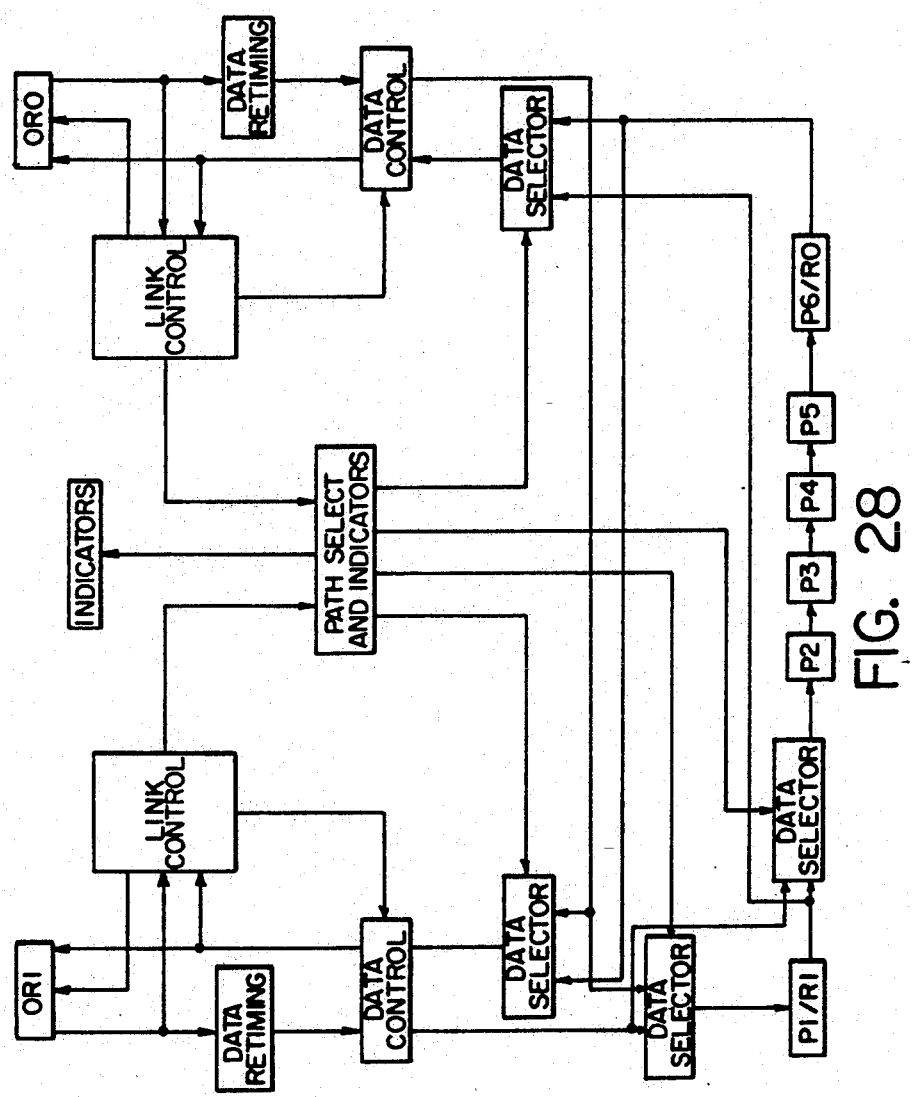
FIG. 28 is a functional block diagram of the major functional components of a base unit forming a node in the free space LAN system.

FIG. 27 illustrates a normal configuration and shows operation with no optic elements attached to the ORI connector 1200 and the ORO connector 1202, respectively. This is a normal configuration and the upstream wrap LED and downstream wrap LED are disabled or turned off. The switch positions are set for ring-in and ring-out, respectively.

We claim:

1. A communication system using directed optical signals in free space as the signalling medium, said system comprising:
   means defining an upstream node;
   means defining a downstream node;
   said upstream node transmitting data to an adjacent said downstream node, said adjacent nodes defining neighboring nodes:
   means defining at least two central nodes, each of said central nodes having:
   means for converting electronic signals to optical signals and optical transmission means for transmitting optical signals and optical receiver means for receiving optical signals and means for converting said received optical signals to electronic signals;
   means for coupling a first central node's electronic signals to a second central node's said means for converting electronic signals to optical signals;
   means for coupling said second central node's electronic signals to said first central node's said means for converting electronic signals to optical signals;
   means defining at least two peripheral nodes, each of said peripheral nodes having optical transmission means for transmitting optical signals and optical receiver means for receiving other optical signals;
   each said peripheral node having electronic communication means for coupling at least one data communication device to transfer information from said node to said data communication device and from said data communication device to said node;
   said first central node's said optical receiver means and optical transmitter means being directed in line-of-sight to a first peripheral node's said optical transmitter means and optical receiver means and said first peripheral node's said optical receiver means and optical transmitter means being directed in line-of-sight to said first central node's said optical transmitter means and optical receiver means and said second central node's said optical receiver means and optical transmitter means being directed in line-of-sight to said second peripheral node's said optical receiver means and optical transmitter means and said second peripheral node's said optical receiver means and optical transmitter means being directed in line-of-sight to said second central node's said optical receiver means and optical transmitter means thereby providing a star communication path for a network.

2. A communication system as defined in claim 1 further comprising at least three central nodes and at least three said peripheral nodes.

3. A communication system as defined in claim 1 wherein the optical wavelength of a first optical signal transmitted by said first peripheral node is different than the optical wavelength of a second optical signal transmitted by said second peripheral node.

4. A communication system using directed optical signals in free space as the signalling medium, said system comprising:
   means defining an upstream node;
   means defining a downstream node;
   said upstream node transmitting data signals to an adjacent said downstream node, said adjacent nodes defining neighboring nodes;
   means defining a first node having a first optical transmission means for transmitting first optical signals and a first optical receiver means for receiving first other optical signals and a second optical transmission means for transmitting second optical signals and a second optical receiver means for receiving second other optical signals;
   means defining at least two neighboring nodes, each of said neighboring nodes having first optical transmission means for transmitting first optical signals and a first optical receiver means for receiving first other optical signals and a second optical transmission means for transmitting second optical signals and a second optical receiver means for receiving second other optical signals;
   each said node having electronic communication means for coupling at least one data communication device to transfer information from said node to said data communication device and from said data communication device to said node;
   said first node's first optical receiver means and optical transmitter means being directed in line-of-sight to said first neighboring node's said first optical transmitter means and optical receiver means and said first neighboring node's said first optical receiver means and optical transmitter means being directed in line-of-sight to said first node's said first optical transmitter means and optical receiver means and said first node's said second optical receiver means and optical transmitter means being directed in line-of-sight to said second neighboring node's said first optical receiver means and optical transmitter means and said second neighboring node's said first optical receiver means and optical transmitter means being directed in line-of-sight to said first node's said second optical receiver means and optical transmitter means thereby providing a string communication path for a network.

5. A communication system as defined in claim 4 further comprising at least four nodes with said fourth node's said first optical receiver means and optical transmitter means being directed in line-of-sight to said neighboring node's said second optical receiver means and optical transmitter means and said neighboring node's said second optical transmitter means and optical receiver means being directed in line-of-sight to said fourth node's said first optical receiver means and optical transmitter means and so on with said fourth node thereby providing a string path for a network.

6. A communication system as defined in claim 4 further comprising said first neighboring node's said second optical receiver means and optical transmitter means being directed in line-of-sight to said second neighboring node's said second optical transmitter means and optical receiver means and with said second neighboring node's said second optical receiver means and optical transmitter means being directed in line-of-sight to said first neighboring node's second optical transmitter means and optical receiver means thereby providing a ring communication path for a network.

7. A communication system as defined in claim 6 further comprising at least four nodes with said fourth node's said first optical receiver means and optical transmitter means being directed in line-of-sight to said first neighboring node's said second optical receiver means and optical transmitter means and said first neighboring node's said second optical transmitter means and optical receiver means being directed in line-of-sight to said fourth node's said first optical receiver means and optical transmitter means with said fourth node's said second optical receiver means and optical transmitter means being directed in line-of-sight to said second neighboring node's said second optical receiver means and optical transmitter means and said second neighboring node's said second optical transmitter means and optical receiver means being directed in line-of-sight to said fourth node's said second optical receiver means and optical transmitter means and so on with said fourth node thereby providing a ring path for a network.

8. A communication system as defined in claim 4 wherein said node further comprises means for indicating visually and/or aurally and electronically a level of power of an optical signal received from said neighboring node and means for indicating visually and/or aurally and electronically a degree of sufficiency of an optical signal received from said neighboring node and a degree of sufficiency of an optical signal transmitted by said first node as received by said neighboring node.

9. A communication system as defined in claim 8 further comprising said node having means for transmitting optically to said neighboring node an indication of a degree of sufficiency of power of an optical signal received from said neighboring node and said neighboring node having means for transmitting optically to said first node acknowledgement of receipt of message indicating said degree of sufficiency of power received by said first node.

10. A communication system as defined in claim 8 further comprising said upstream node having means for transmitting data signals optically to said downstream neighboring node when the power of an optical signal as received by said downstream neighboring node is sufficient and the power of an optical signal as received by said upstream node as transmitted by said downstream neighboring node is sufficient and where said upstream node has means for inhibiting data from being sent to said downstream neighboring node when the power of an optical signal as received by said downstream neighboring node is not sufficient or when the power of an optical signal as received by said upstream node as transmitted by said downstream neighboring node is not sufficient.

11. A communication system as defined in claim 8 further comprising said node having means for altering configuration of a network path when the power of said optical signal as received by said node from said upstream neighboring node is not sufficient or when the power of said optical signal that said node sends to said upstream neighboring node as received by said upstream neighboring node is not sufficient, said alteration of configuration comprising means for said node to route the network path from said node's said downstream optical receiver means to said node's said upstream optical receiver means and said node further having means for altering the configuration of the network path when the power of said optical signal that said node receives from said downstream neighboring node is not sufficient or when the power of said optical signal that said node sends to said downstream neighboring node as received by said downstream neighboring node is not sufficient, said alteration of configuration further comprising means for said node to route the network path from said node's said upstream optical transmitter means to said node's said downstream optical transmitter means.

12. A communication system as defined in claim 8 further comprising said node having means for restoring said configuration of said network path when said optical signal between said neighboring nodes that had been received with insufficient optical power is received with sufficient optical power.

13. A communication system as defined in claim 12 further comprising said node having means for restoring said configuration of said network path when said optical signal between said neighboring nodes that had been received with insufficient optical power is received with sufficient optical power without said node's recourse to other control means.

14. A communication system as defined in claim 8 further comprising said node having means for responding to command signals from said connected data communication device to alter the configuration of said network path.

15. A communication system as defined in claim 14 further comprising said node having means for responding to command signals from said connected data communication device to alter the configuration of said network path without said node's recourse to other control means.

16. A communication system as defined in claim 8 further comprising said node having means for delaying insertion of a coupled data communication device into said network path a specified time interval after said bi-directional optical link with said neighboring node has been established.

17. A communication system as defined in claim 8 further comprising said optical signals for controlling data path configuration having a different optical wavelength than optical signals for data packets.

18. A communication system as defined in claim 8 further comprising said optical signals for controlling data path configuration having a different carrier frequency than optical signals for data packets.

19. A communication system as defined in claim 8 wherein the operation of said nodes conform with IEEE 802.3 standards for Carrier Sense Multiple Access/Collision Detection with means for said node with said data communication device that is transmitting to disconnect a link between the output of said node's said upstream optical receiver means and the input to said data communication device while said data communication device is transmitting and with means for said nodes with said attached data communication devices that are not transmitting to route simultaneously received data signals to said data communication devices and too said neighboring downstream node.

* * * * *